United States Patent [19]

Kihara

[11] 3,821,787

[45] June 28, 1974

[54] MAGNETIC RECORDING AND/OR REPRODUCING SYSTEM

[75] Inventor: Nobutoshi Kihara, Tokyo, Japan

[73] Assignee: Sony Corporation, Tokyo, Japan

[22] Filed: Aug. 3, 1972

[21] Appl. No.: 277,815

[30] Foreign Application Priority Data

Aug. 13, 1971 Japan .............................. 46-61460

Aug. 24, 1971 Japan .............................. 46-64625

[52] U.S. Cl. ...................... 358/4, 360/33, 360/70

[51] Int. Cl. .......................................... H04n 5/76

[58] Field of Search ...... 178/5.4 CD, 6.6 A, 6.6 HS, 178/6.6 SF

[56] References Cited

UNITED STATES PATENTS

| | | | |
|---|---|---|---|
| 3,215,772 | 11/1965 | Kihara | 178/6.6 A |
| 3,234,325 | 2/1966 | Backers et al. | 178/6.6 A |
| 3,359,365 | 12/1967 | Kihara | 178/5.4 CD |
| 3,376,383 | 4/1968 | Felix | 178/6.6 A |

*Primary Examiner*—Robert L. Richardson

*Attorney, Agent, or Firm*—Curtis, Morris & Safford

[57] ABSTRACT

Improved utilization of magnetic tape is obtained in recording video signals by recording the slant tracks closer together or even overlapping. The possibility of interference between the adjacent tracks is reduced by gating the signals recorded on adjacent tracks so as to record only alternate intervals of at least selected portions on each track. The intervals are chosen so that the areas on one track on which such selected portions are recorded are adjacent areas on the next adjacent track on which the selected portions are not recorded. In playback the recorded selected portions are combined with replicas thereof delayed an odd multiple of each recording interval, thereby reconstituting a continuous video signal. Preferably, alternate line intervals are recorded, and the delay in playback is thus an odd multiple of a line interval. The selected portions gated for alternate intervals may be the chrominance signals or even the entire video signal.

38 Claims, 60 Drawing Figures

MAGNETIC RECORDING AND/OR REPRODUCING SYSTEM

BACKGROUND OF THE INVENTION

1. Field of the Invention

This invention relates to the field of magnetically recording video signals. In particular, it relates to recording at least selected portions only during alternate intervals so related in time that these selected portions will be recorded in a checkerboard pattern of non-adjacent areas on the recording medium.

2. The Prior Art

In recording video signals on magnetic tape, the tape is normally wrapped part-way around a recording drum which houses rotating recording heads. The tape is wrapped along a section of a helical path so that the heads record video signals on tracks that cross the tape at an angle to the longitudinal direction thereof. Although playback devices are supposed to be aligned so as to follow the recorded tracks precisely, such alignment is not always followed. In order to prevent the playback head from picking up signals from adjacent tracks, it has been common to space the tracks apart by a distance approximately equal to the width of each track or at least by a distance of half the width. Thus a substantial portion of the tape, from 30 to 50 percent of the total length, is not used.

It is always desirable to reduce the amount of tape used to record a given time interval of information. With the advent of compact video tape recorders intended for use in the home, the need for saving tape is even greater. One reason is to reduce the cost of the tape and another reason is to permit the apparatus to be packaged in as small a space as possible. It thus has become increasingly important to make better utilization of the tape area by recording the slant tracks closer together, and that is one of the objects of the present invention.

In recording color video signals, the practice is to separate the luminance and chrominance components, frequency-modulate a carrier of about 4.2MHz with the luminance components, convert the frequency band of the chrominance components so that the carrier is shifted to a frequency of about 560KHz, and then record simultaneously the frequency-modulated carrier and the frequency-converted chrominance signals. It is the chrominance signals that are most likely to cause interference between adjacent tracks on the tape, and therefore it is a more particular object of the present invention to minimize interference between the chrominance portions of the signal on adjacent tracks.

U.S. Pat. No. 3,215,772 teaches the technique of recording video signals on adjacent tracks on a magnetic tape in such a way that the horizontal synchronizing signals are aligned with each other. This is known as H alignment. It has the advantage that if the playback transducer picks up information from two adjacent tracks, the synchronizing signals that it receives from both of the tracks will arrive simultaneously and will not adversely affect the operation of the synchronizing signal section of the reproducing device.

BRIEF SUMMARY OF THE INVENTION

The present invention makes use of the recording technique that results in H alignment and, in addition, gates at least the chrominance signal portion so that only alternate intervals are recorded. It is convenient to make each of these intervals equal in duration to one horizontal line, or 1 H. Thus, in the first track, which normally includes all of the signals necessary to complete one television field, the chrominance signals would be recorded only for the odd lines or only for the even lines. The second field that makes up a first television frame would be recorded in the same fashion but whether the chrominance signals during the second field would be recorded during odd line intervals or even line intervals, would depend upon what was necessary to assure that the chrominance components that were recorded in the second field would be aligned with spaces between the chrominance components that had been recorded in the first field. Whether the same order, i.e., odd or even, line intervals of chrominance signals were recorded in the second field as in the first field would depend upon the slant angle and width of the tracks and upon whether the tracks were recorded so that the slant angle was acute or obtuse with respect to the longitudinal direction of the tape. In addition, the recording order for the second frame would be the reverse of the order for the first frame. That is, under certain conditions, if odd lines of the chrominance signal were recorded in the first field, and the relationships set forth above were such that odd line intervals were also to be recorded in the second field, the even line intervals would be recorded in each of the third and fourth fields. On the other hand, there are circumstances in which, if odd line intervals were recorded in the first field, even line intervals would have to be recorded in the second field of the first frame. In that case, the order would be reversed in the second frame, and even line intervals would be recorded in the first field of the second frame, while odd line intervals would be recorded in the second field of the second frame. In any case, after two complete frames, the order returns to what it was in the first field of the first frame.

By virtue of the checkboard array of recording the potentially interfering signals, the space between adjacent tracks can be substantially reduced, for example to one-tenth of the width of a track or even less. In fact it is possible to eliminate the guard band space between tracks entirely and have each track contiguous with the adjacent tracks.

The actual recording of signals on a track results in the alignment of magnetic domains to form the equivalent of minute magnets extending across each track. The exact angle of orientation of these minute magnets depends on the orientation of the air gap in the recording head. The air gap may be perpendicular to the track direction and in that case the minute magnets will be so aligned. On the other hand, it is common to have two recording heads in a rotating arrangement, and in that case, the air gap in one head may be at one angle with respect to the track and the air gap in the other head at a different angle. These angles are referred to as azimuth angles. The playback heads must of course have the same azimuth angles as the recording heads. The utilization of heads having two azimuth angles further reduces the reproduction of information from adjacent tracks, and by the use of checkerboard recording array in accordance with the present invention, the tracks may be overlapped rather than having a guard band space between them. The tracks may be also overlapped in the case of an azimuth angle of 90° but the overlapping can be greater in the case of two azimuth angles other than 90° unless the entire video signal is gated.

In the reproducing apparatus, signals must be produced to fill in the intervals when no signals were recorded. This is accomplished by applying the reproduced intermittent signals to a delay device having a time delay exactly equal to the gated interval in the recording apparatus. The output of the delay device is thus a replica of the gated signal but lagging in time by the amount of the gated interval or by an odd multiple of this amount. This replica signal is then combined with the non-delayed signal to fill in the gaps in the non-delayed signal and thereby produce a continuous signal suitable for use in a picture reproducing device. It is possible simply to add the undelayed signal to the delayed signal to fill in these gaps if these signals have been reproduced in such a way as to minimize noise reproduction. If they have not been reproduced in this way, it is preferable to use a switching circuit to select either the delayed signal or the undelayed signal.

BRIEF DESCRIPTION OF THE DRAWINGS

FIG. 8 is a block diagram of a modified embodiment of apparatus for recording signals in accordance with the present invention.

FIG. 20 illustrates a relationship similar to that in FIG. 12 but with the entire signal being sampled rather than just the chrominance components.

DETAILED DESCRIPTION OF THE INVENTION

Figure 1:
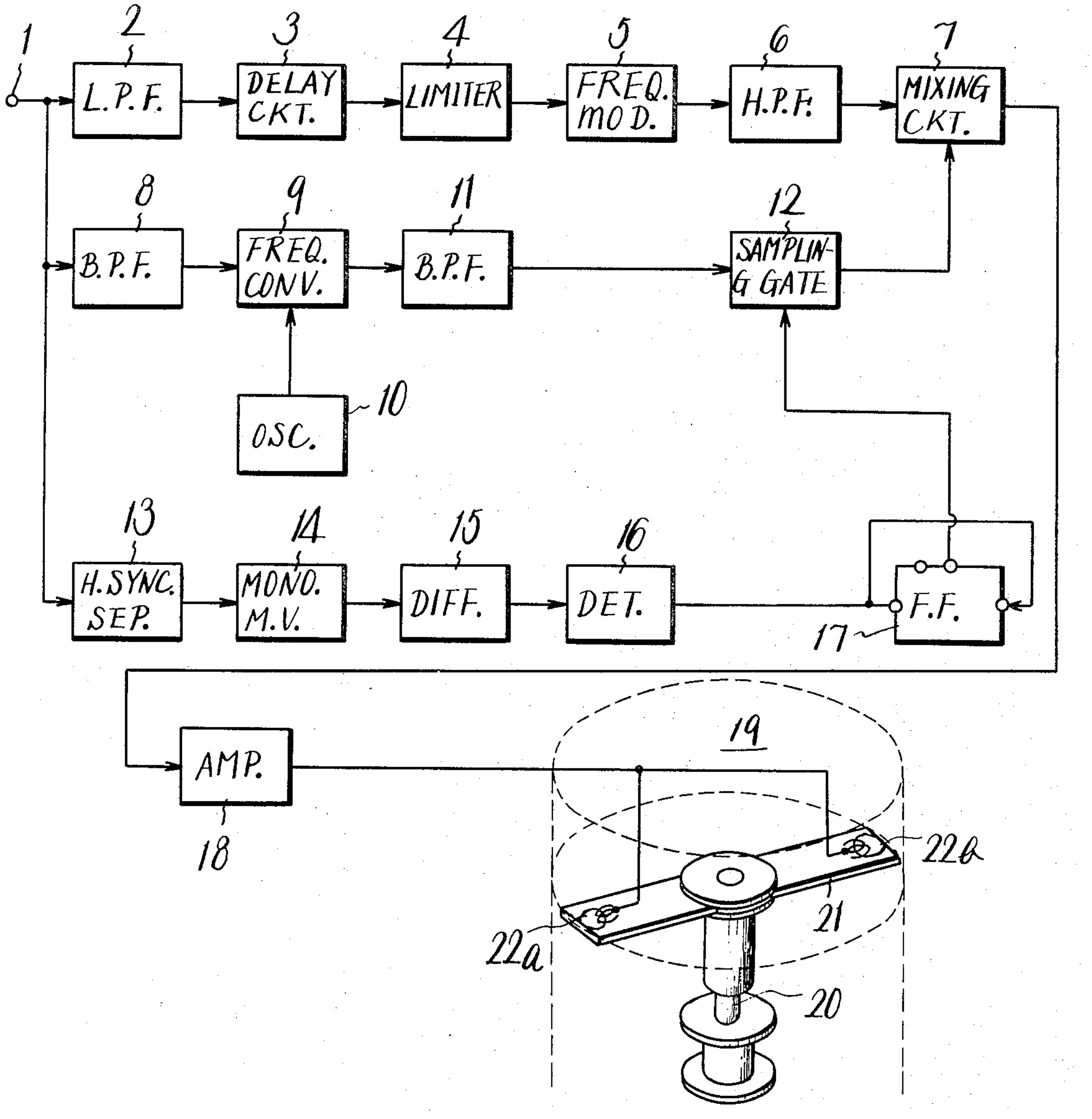
FIG. 1 is a block diagram of apparatus for recording video signals on tape in accordance with the present invention.

The recording apparatus in FIG. 1 has an input terminal 1 connected to several different circuits, one of which is a low pass filter 2. The purpose of this filter is to extract the luminance signals from the complete video signal applied to the terminal 1. The output of the low pass filter 2 is connected through a delay circuit 3 to a limiter 4. The output of the limiter 4 is applied to a frequency modulator 5 and is used to modulate the frequency of a carrier. The output of the frequency modulator 5 is connected to a high pass filter 6 to remove low frequency components and the output of this filter is then applied to a mixing circuit 7.

A second circuit connected to the input terminal 1 is a band pass filter 8 that passes the chrominance components of the complete video signal applied to the terminal 1. These chrominance components are then applied to a frequency converter 9, such as a balanced modulator, which also receives oscillations from an oscillator 10 to convert the carrier of the chrominance signals from 3.58MHz to a lower frequency, for example 560KHz. The output of the frequency converter 9 is applied to a band pass filter 11 to remove high frequency components and from there to a sampling gate 12 that transmits alternate intervals of the chrominance signal in accordance with this invention.

The alternate intervals are selected to be the alternate horizontal line intervals of the television signal and in order to obtain the necessary switching control, the video signal applied to the terminal 1 is also connected to a horizontal synchronizing signal separator 13. The output of this sync separator is connected to a monostable mutlivibrator 14 which, in turn, supplies a signal to a differentiating circuit 15. The output of the differentiating circuit 15 is passed through a rectifier, or detector, circuit 16 and applied to a flip-flop circuit 17. The flip-flop circuit controls the operation of the sampling gate 12 and the output of this gate is then connected to the mixing circuit 7. The output of the mixing circuit may, if necessary, be amplified in an amplifier 18 and applied to a rotary magnetic head assembly 19 that comprises a support 21 mounted on a rotating shaft 20 to be driven at a predetermined speed by a motor (not shown). At opposite ends of the support 21 are magnetic transducers 22a and 22*b* connected in parallel to the output of the amplifier 18. The tape is wound preferably slightly more than half-way around a cylindrical surface indicated in dotted lines. The tape path is a section of a helix and crosses the path of the transducers 22*a* and 22*b* as they are rotated by the shaft 20.

Figure 2A:
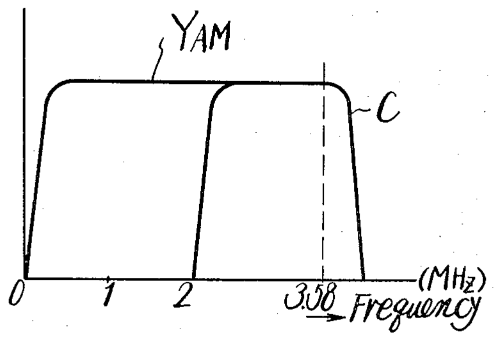
FIGS. 2A and 2B are band pass characteristics of different parts of the circuit in FIG. 1.
Figure 2B:
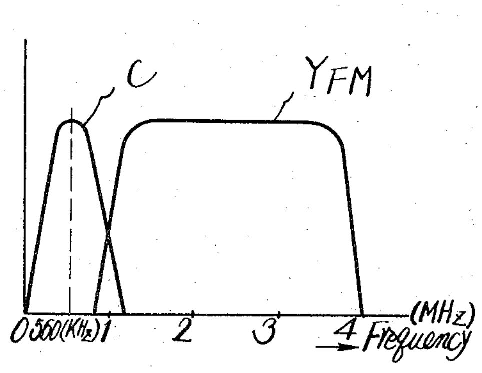

The operation of the apparatus in FIG. 1 will be described with reference to FIGS. 2A and 2B and FIGS. 3A–3E. The total incoming signal applied to the terminal 1 is indicated in FIG. 2A as occupying the band between 0 and approximately 4MHz. This signal includes the luminance components indicated by the designation $Y_{AM}$ and the chrominance components indicated by C. After the chrominance components have been separated from the luminance components and converted to a lower frequency, they occupy the band indicated by C in FIG. 2B as they are applied to the mixing circuit 7. At the same time the luminance components, having been used to modulate the frequency of a carrier in the frequency modulator 5, are now designated $Y_{FM}$ in FIG. 2B and occupy a frequency band from approximately 1MHz to approximately 4MHz.

Figures 3A, 3B, 3C, 3D, 3E:
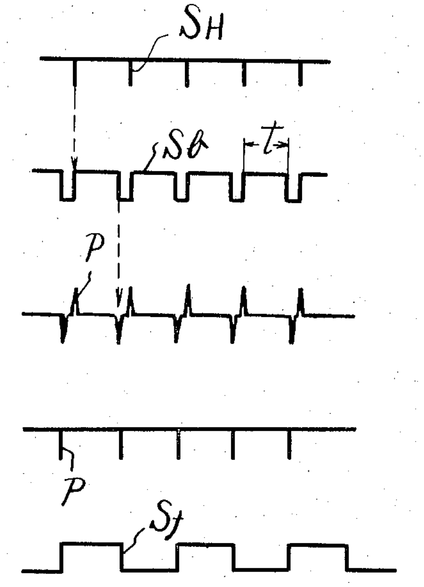
FIGS. 3A–3E show pulse wave forms obtained in the operation of the circuit in FIG. 1.

In order to obtain the necessary switching information, the video signal applied to the sync separator 13 results in the production of sync signals indicated $S_H$ in FIG. 3A. These signals are then applied to the monostable multivibrator 14 to produce a pulse wave having a relatively high duty cycle as indicated by the fact that the duration *t* of the positive portion is much greater than the duration of the negative portion. In fact, the ratio of these two durations is so great that it is desirable to divide the monostable multivibrator 14 into two monostable multivibrators, one of which has time constants that cause it to produce an output signal similar to that in FIG. 3B but with a duty cycle such that the positive half is somewhat greater than 0.5H, for example, approximately 0.7H. This first multivibrator may then be used to trigger a second multivibrator which produces a signal having a positive portion such that the total of its positive portion with that of the first multivibrator results in the signal $S_b$ as shown in FIG. 3B.

The signal $S_b$ at the output of the monostable multivibrator, or multivibrators, 14 is differentiated in the circuit 15 to produce an output signal indicated by P in FIG. 3C. This signal is then passed through the detector 16 which selects the negative going part as indicated in FIG. 3D and designated P. The latter signal is then used to trigger the flip-flop circuit 17 to reverse its state of conductivity at the occurrence of each of the negative going pulses P shown in FIG. 3D. Thus, the output of the flip-flop circuit 17 is indicated by the square wave $S_f$ in FIG. 3E and is applied to the sampling gate 12 to control its operation. The duty cycle of this wave is exactly 50% and therefore each positive portion and each negative portion is equal to 1H in duration. When applied to the sampling gate 12 it permits the sampling gate to transmit the chrominance components exactly one half the time. The reason for delaying the exact time of switching so as to occur slightly before the next horizontal synchronizing signal, is to avoid having the switching take place in a visible part of the horizontal line. By virute of the relatively long time *t* of the signal in FIG. 3B, the pulses P shown in FIG. 3D occur just before the leading edge of the next horizontal synchronizing signal $S_H$ in FIG. 3A.

Figure 4A:
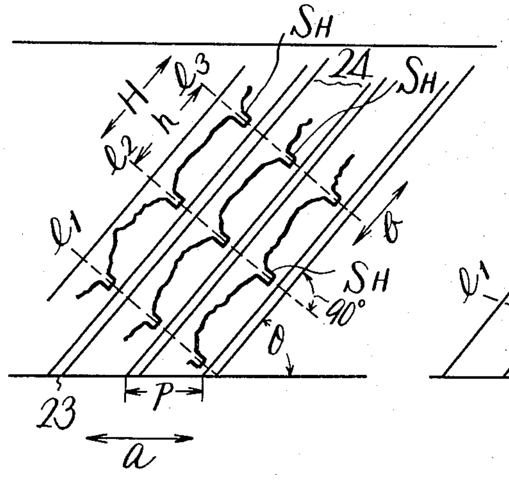
FIGS. 4A and 4B illustrate the relationships that obtain in H alignment of signals recorded on magnetic tape.
Figure 4B:
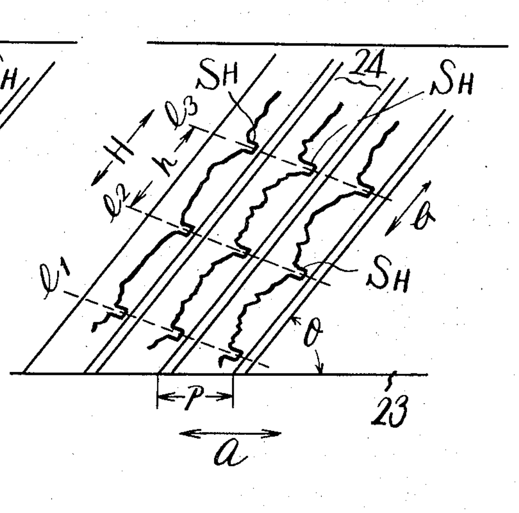

FIGS. 4A and 4B illustrate the relationship that obtains when there is what is known as H alignment of the signals on the magnetic tape. Each of FIGS. 4A and 4B shows a short strip of magnetic tape 23 with several recorded tracks 24 thereon. For illustrative purposes only a small portion of each of the tracks 24 is illustrated and wave forms are shown in each track to indicate the location of the horizontal synchronizing signals. The direction of movement of the tape 23 is indicated by the arrow *a* and may be either to the left or to the right. Similarly, the rotating magnetic transducers 22*a* and 22*b* in FIG. 1 may scan the tracks 24 along the direction *b* that makes an angle of $\theta$ with respect to the longitudinal direction of the tape 23. The relative movement of the tape and the transducers is conventionally such that one of the tracks 24 contains a recording of all of the lines in one television field. In the case of the NTSC television system, each field has 262½ lines. Each frame is made of two fields and therefore has a total of 525 lines. Since the velocities are constant, each television line interval is recorded in an equal length of each of the tracks 24 and if it is assumed that the first track on the right in FIG. 4A is the first field of one television frame, the line recorded between the marks $1_1$ and $1_2$ represents the first line of this field. At the end of 262½ such lines, the second track 24 is begun. The linear spacing along the tape 23 between the initial points of the two tracks is indicated by the letter P which designates the pitch of the recording. Since the second track begins with a half line interval, the point designated by $1_1$ in the second track must be one half line from the edge of the tape 23 at which the second track begins if there is to be H alignment. Thus, in the small triangle of which the pitch P is the hypotenuse and the alignment of the points $1_1$ is exactly perpendicular to the tracks 24, the distance between the intersection of the point $1_1$ and the lower edge of the tape in the second track is $h/2$ where *h* is the length of the track 24 needed to record one horizontal line interval H. Thus, $$h/2 = P \cos\theta$$

for H alignment. Later it will be shown that if the relationship between the tracks and the tape is somewhat different, H alignment can be obtained using the more general equation $$(X - 1/2)h = P \cos\theta$$

where *X* is any positive integer. The term *P* is given by the equation $$P = S \div 60$$

where *S* is the velocity of the tape in millimeters/second, and the term h is given by the equation $$h = 2V/525 \times 60$$

where *V* is the velocity of the transducers 22*a* and 22*b* along the tracks 24 in millimeters/second.

If the gaps in the magnetic transducers 22*a* and 22*b* are perpendicular to the tracks 24 traced out by these transducers, the foregoing relationships, as indicated in FIG. 4A, will result in H alignment. In that case, the playback transducer, which must also have a gap perpendicular to the tracks 24, could pick up signals from two adjacent tracks without losing synchronization. This is due to the fact that the transducer would receive the signals for horizontal synchronization from both tracks at exactly the same instant.

If the tracks are recorded by a transducer having an azimuth angle other than 90°, and the same azimuth angle is used for both of the transducers 22a dnd 22b, the relationship shown in 4B would result. The alignment is simply skewed with respect to the tracks 24 but the same equations are still valid.

Figure 5A:
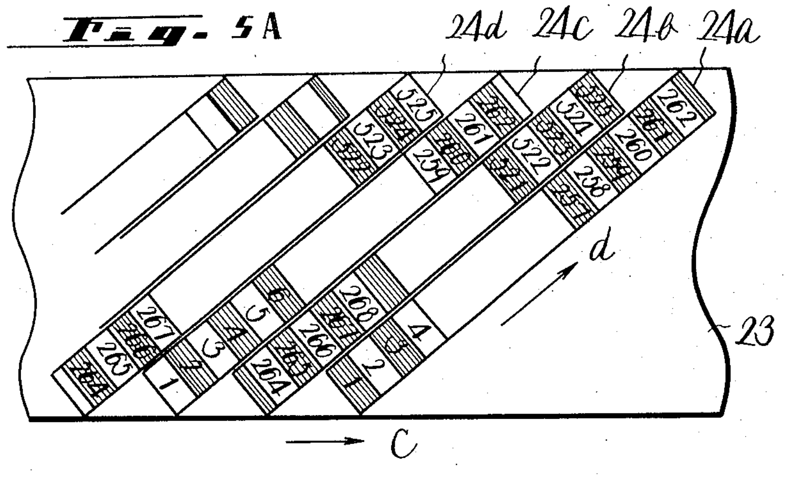
FIG. 5A illustrates the recording of signals to form a checkerboard pattern when the angle between the direction of movement of the tape and the direction of recording along each of the tracks is less than 90°.
Figure 5B:
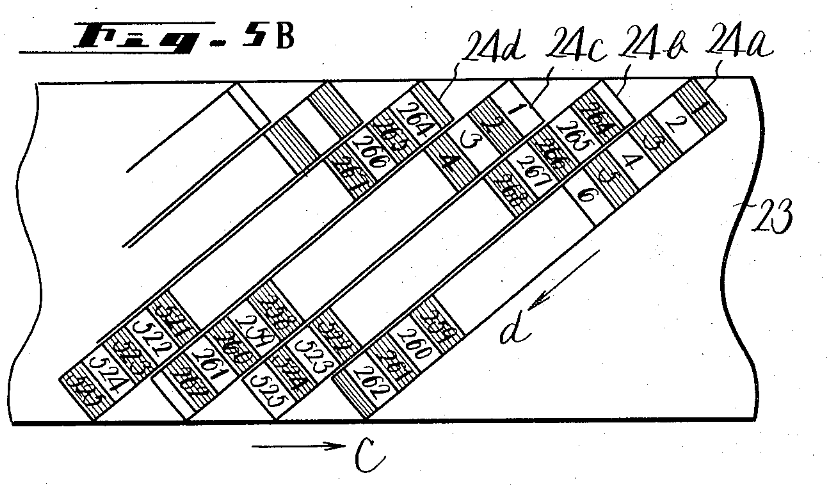
FIG. 5B shows the same recording relationship as FIG. 5A except that the angle is greater than 90°.

FIGS. 5A and 5B illustrate the relationship for H alignment when $X=3$. The track 24*a* is illustrated partially divided into intervals of 1H and the shading indicates that the odd line intervals are the ones on which the chrominance signal has been recorded. Comparison of the tracks 24*a* and 24*b* shows that track 24*b* has been offset 2½h from the track 24*a*, which means that $X=3$. As a result, the 266th-line interval is located directly alongside the first line interval. Since the chrominance signal was recorded during the first line interval and all odd line intervals in the first track 24*a*, no chrominance signal must be recorded in the 266th-line interval or any even line interval in the second track 24*b*. As a result, such information is recorded only during odd line intervals in each of the tracks 24*a* and 24*b* which together comprise the first television frame on the tape 23. However, it will be observed that the same alignment requirement makes it necessary to record chrominance signals only during the even lines in the third track 24*c* and in the fourth track 24*d* which, together, make up the recording of the first and second fields of the second television frame. Thereafter for the next track, the relationship goes back to that of the first recorded track 24*a*. As may be seen, it requires two complete television frames made up of four fields to complete a switching cycle. In the example given, the chrominance signals were recorded in the four tracks 24*a*–24*d* in the order odd, odd, even, even. Alternatively, the information could have been recorded in these four tracks in the order even, even, odd, odd.

The direction of movement of the tape 23 in FIG. 5A is indicated by the arrow C and the direction of movement of the transducers in forming the tracks 24*a*–24*d* is indicated by the arrow *d*. Thus, the angle $\theta$ between the directions of these two arrows is less than 90°. Furthermore, although the actual relationship of the tracks 24*a*–24*d* in FIG. 5A is such that $X=3$, the same relationship holds for $X$ equals any odd integer.

FIG. 5B shows basically the same recording relationship as FIG. 5A except that the transducers 22*a* and 22*b* in FIG. 1 are moving in the reverse direction so that they scan the lines 24*a*–24*d* in the reverse direction and the angle $\theta$ is obtuse. This makes a difference in the order in which chrominance information can be recorded in the alternate line intervals. As illustrated, chrominance information is recorded in the odd line intervals in track 24*a* in FIG. 5B but in order to obtain the necessary checkerboard relationship, it must be recorded in the even line intervals in track 24*b* and in the even intervals in track 24*c* but in odd intervals in track 24*d*. Thus, the total cycle is odd, even, even, odd, and this is true for any recording relationship in which $X$ is an odd integer.

Figure 6A:
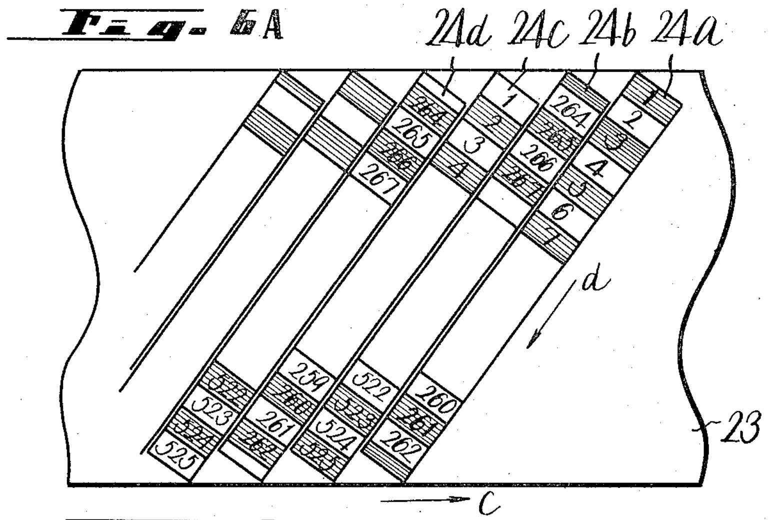
FIGS. 6A and 6B correspond to FIGS. 5A and 5B, respectively, but with a different angular relationship.
Figure 6B:
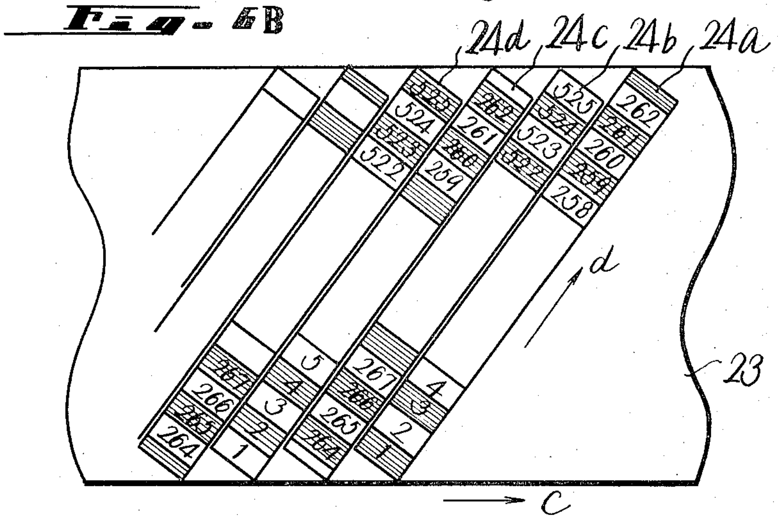

FIGS. 6A and 6B correspond to FIGS. 5B and 5A, respectively. The relationship shown in FIGS. 6A dnd 6B is true when $X$ is any even integer.

In FIG. 6A the direction of movement of the transducers, as indicated by the arrow *d* is opposed to the movement of the tape indicated by the arrow C. If chrominance information is recorded in the odd lines in the first track it must be recorded in odd lines in the second track but in even lines in the third and fourth tracks. The reverse is true in FIG. 6B in which the direction of movement of the transducers is with the tape movement rather than opposed to it. In this case, if chrominance signal information is recorded in the odd lines of the first track, it must be recorded in even lines in the second track and in even lines in the third track but in odd lines in the fourth track. The progression is thus odd, even, even, odd.

Figure 7A:
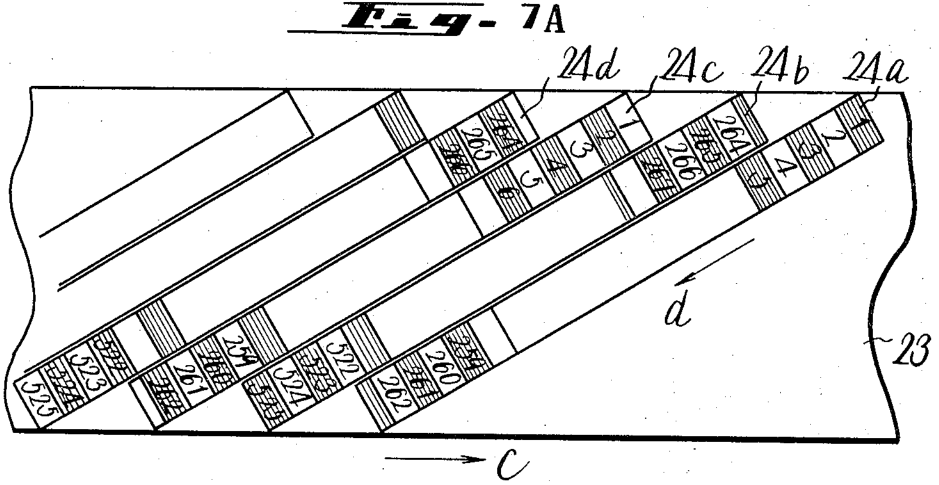
FIGS. 7A and 7B also correspond to FIGS. 5A and 5B but with a still different angular relationship.
Figure 7B:
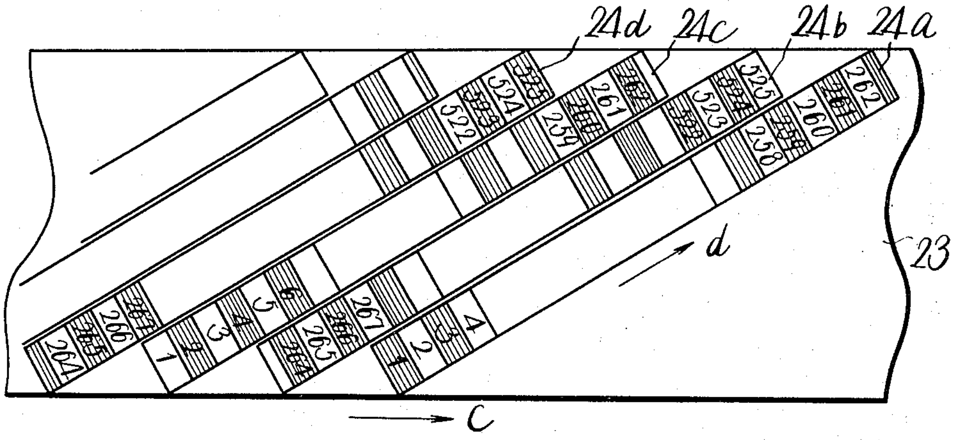

FIGS. 7A and 7B correspond to FIGS. 6A and 6B, respectively, except that they indicate the relationship when $X=4$. In FIG. 7A, the progression is odd, odd, even, even, just as in FIG. 6A. In FIG. 7B the progression is odd, even, even, odd, just as in FIG. 6B.

The patterns in FIGS. 5A, 6A, and 7A can be generated by a simple switching circuit that simply transmits the gated signal to the transducers 22*a* and 22*b* during alternate line intervals of one field after another without any change. The patterns in FIGS. 5B, 6B and 7B, however, require more complex switching.

FIG. 8 shows recording apparatus similar to that in FIG. 1 with the addition of automatic means for controlling the switching of the sampling gate 12 to produce reversal as shown in FIG. 5B. The components having the same reference numerals in FIG. 1 need not be described again. The new components not shown in FIG. 1 include a vertical synchronization signal separator 25 connected to receive the incoming complete video signal from the terminal 1. The vertical sync separator 25 is connected to a monostable multivibrator 26, the output of which is connected to a differentiating circuit 27 to produce positive-going and negative-going impulses. The differentiating circuit 27 is connected to a detector 28 to select only one polarity of the differentiated signals, and the detector 28 is connected to a second flip-flop circuit 29 to produce a square wave having a repetition rate equal to the vertical repetition rate of the television image.

The outputs of the flip-flops 17 and 29 are combined in a logic circuit to produce the necessary switching signal for the sampling gate 12. The flip-flop 17 has outputs 17*a* and 17*b* and the flip-flop 29 has outputs 29a and 29b. The outputs 17*a* and 29*a* are connected to a first NAND gate 31, and the other two outputs 17*b* and 29*b* are connected to a second NAND gate 32. The outputs of these two NAND gates are connected to a third NAND gate 33 and its output is connected as the switching signal to the sampling gate 12.

The operation of the circuit in FIG. 8 will be described with reference to the signals shown in FIGS. 9A–9G. The output of the flip-flop 17 at the terminal 17a is indicated by the signal $S_1$ in FIG. 9A and the output signal at the terminal 17*b* is indicated by the signal $S_2$ in FIG. 9B. The signal $S_2$ is the inverse of the signal $S_1$. Similarly, the output of the flip-flop 29 at the terminal 29*a* is indicated by the signal $S_3$ in FIG. 9C and the output at the terminal 29*b* is indicated as the signal $S_4$ in FIG. 9D. When the signals $S_1$ and $S_3$ are combined in the NAND gate 31 the resultant output signal is indicated by the signal $S_5$ in FIG. 9E.

Figure 9:
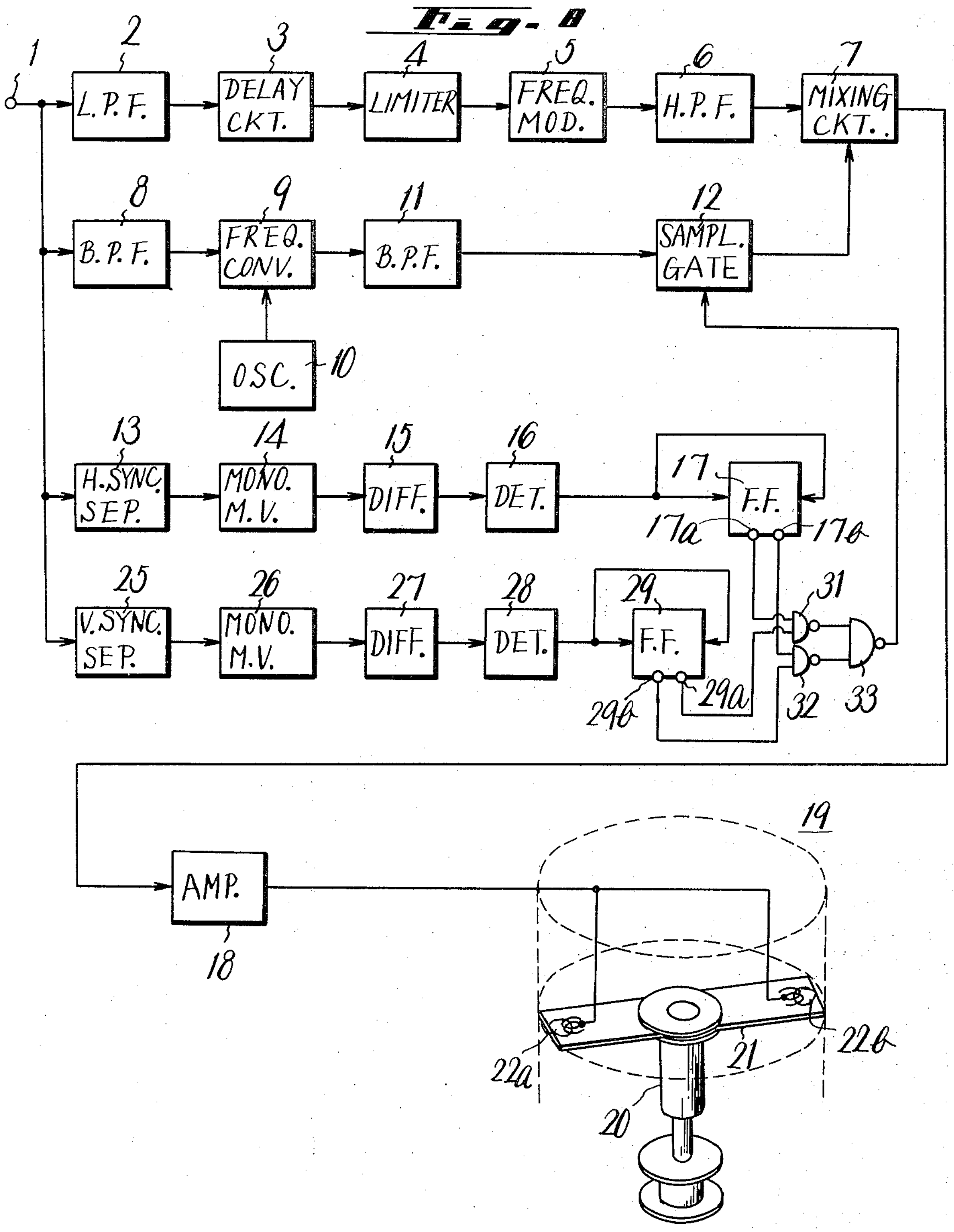
FIGS. 9A–9G illustrate the logical wave forms obtained in the circuit of FIG. 8 under one set of recording conditions.
Figures 9A, 9B, 9C, 9D, 9E, 9F, 9G:
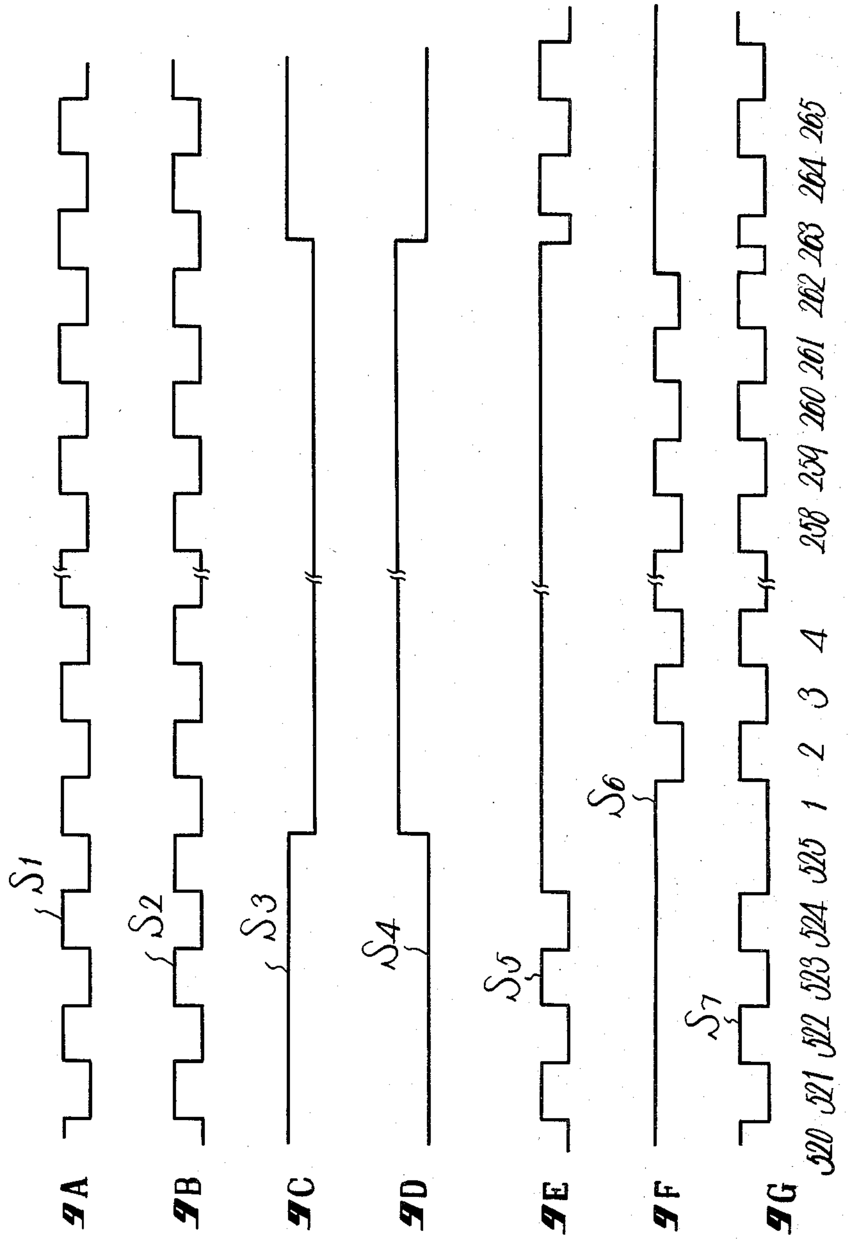

The output signals of the terminals 17*b* and 29*b* are indicated by the reference numerals $S_2$ and $S_4$ in FIGS. 9B and 9D, respectively. When these signals are applied to the NAND gate 32, they produce an output signal $S_6$ shown in FIG. 9F. Applying signals $S_5$ and $S_6$ to the NAND gate 33 produces the final output switching signal $S_7$ shown in FIG. 9G.

The sampling gate 12 is arranged so that the chrominance signal can pass through it when the signal $S_7$ has a low value but cannot pass through when the signal $S_7$ has a high value. Thus, starting with the line indicated as line 1, odd lines are gated through to the mixing circuit 7 during the first field of 262½ lines. Even lines are gated through during the second field which, in FIG. 5B, is recorded on the track 24*b*. The left-hand end of FIG. 9G shows the switching condition at the end of the fourth track 24*d* in FIG. 5B, and, as required, the odd line intervals are being gated through to the mixing circuit. Thus, there is a reversal from the recording of odd to even lines in passing from the first to the second fields but no reversal from odd to odd in passing from the fourth field to the first field.

Since the only types of progression are odd, odd, even, even, as shown in FIGS. 5A, 6A and 7A, or odd, even, even, odd, as shown in FIGS. 5B, 6B and 7B, the circuits in FIGS. 1 and 8 can accommodate all requirements.

Figure 11:
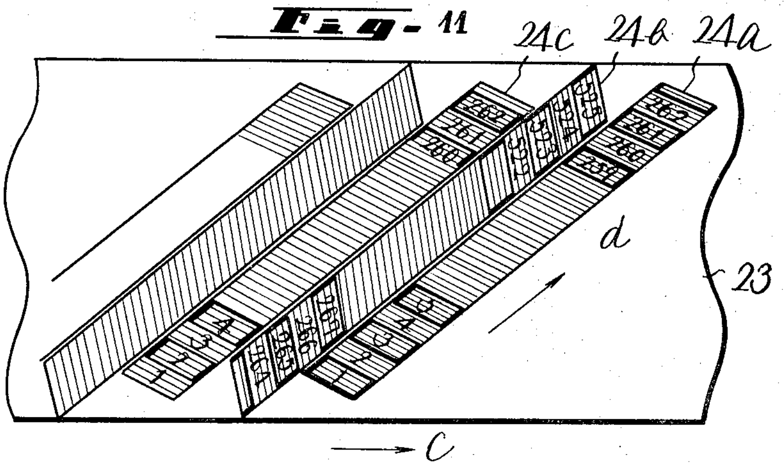
FIG. 11 illustrates the recording tracks formed by the transducers in FIGS. 10A and 10B with the luminance signal recorded continuously and the chrominance signal recorded intermittently.
Figure 10A:
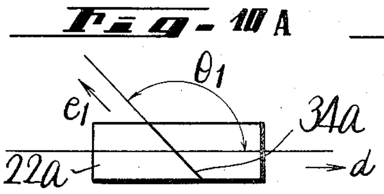
FIGS. 10A and 10B illustrate two different azimuth angles in recording and playback transducers.
Figure 10B:
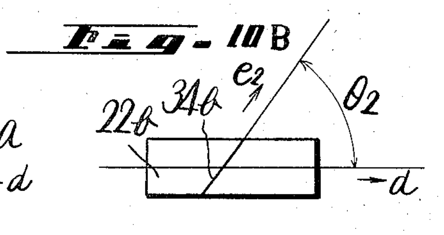
Figure 12:
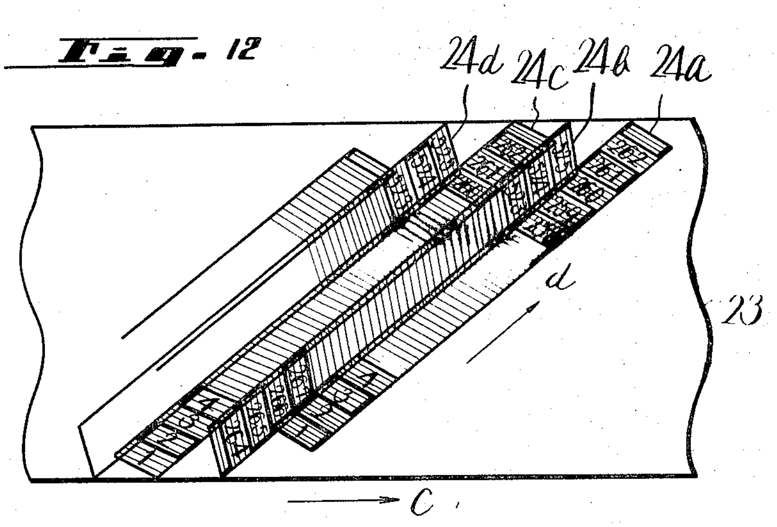
FIG. 12 illustrates the same recording relationship as FIG. 11 except that adjacent tracks have been placed so close together that they overlap.

FIGS. 10A and 10B illustrate magnetic transducers 22*a* and 22*b* formed with air gaps having different azimuths. The angles between the direction of movement of the transducers 22*a* and 22*b* and the width directions $e_1$ and $e_2$ of the gaps 34*a* and 34*b* in these transducers are identified as $\theta_1$ and $\theta_2$, which are not equal to each other. The tracks recorded using such transducers are shown in FIG. 11. All line intervals are indicated shaded in this FIG. to illustrate the fact that the luminance signal is recorded in every interval. However, as is more clearly evident in the earlier FIGS. 5A and 5B, for example, the chrominance signal is recorded only on alternate lines. As was true in the case of the recordings indicated in FIGS. 5–7, the tracks 24 may be placed very close to each other because the potentially interfering signals are not recorded in adjacent areas. In fact, as shown in FIG. 12 it is possible for the tracks to be recorded in such a way that they overlap each other slightly, for example, to the extent of approximately 10 percent of their total width, or even somewhat more, without the danger of crosstalk. In the case of transducers having different azimuths, the crosstalk is further reduced because the signals picked up from a second track by a transducer following a first track would be at a different azimuth relationship and would be indistinct. Reducing the guard band spacing between adjacent tracks to a small fraction of the track width is a distinct advantage over existing recording apparatus, but reducing the guard band to zero or even less than zero is, of course, an even greater improvement.

Figure 13:
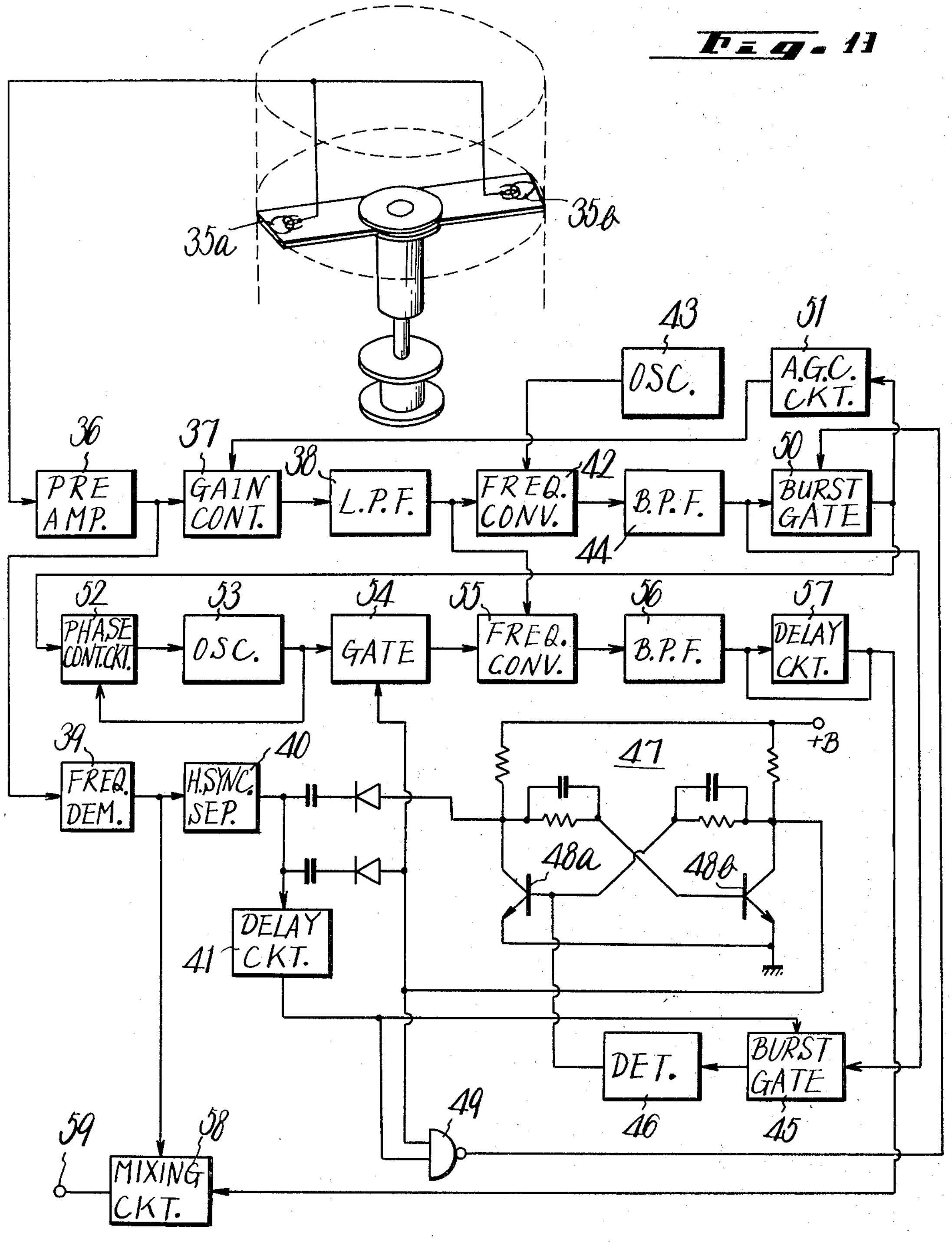
FIG. 13 is a block diagram of one form of reproducing apparatus in accordance with this invention.

FIG. 13 shows reproducing apparatus for reproducing signals as recorded in the patterns illustrated in FIGS. 5A and 5B or in FIGS. 11 and 12. FIG. 13 has playback transducers 35*a* and 35*b* and if these transducers have azimuth angles of 90°, they are suitable for reproducing the signals as recorded in FIGS. 5A and 5B but if they have other azimuth angles corresponding to those illustrated in FIGS. 11 and 12, this system is suited for reproduction of signals recorded as shown in FIGS. 11 and 12.

The transducers 35*a* and 35*b* are connected in parallel to a preamplifier 36, the output of which is connected to a variable gain circuit 37. The signal from this variable gain circuit is applied to a low pass filter 38 in which the band of frequencies that comprises the chrominance signal is recorded.

The output of the preamplifier 36 is also connected to a frequency-modulation detector, or demodulator 39, and the output signals from that circuit are connected to a horizontal sync separator 40 that supplies horizontal sync signals to a delay circuit 41.

A frequency-converter 42 receives the signals from the low pass filter 38 as well as signals from an oscillator 43, having a frequency of 3.58MHz. The output of the frequencyconverter 42 is connected to a band pass filter 44 tuned to a band around the frequency of 4.14MHz and the output of this filter is connected to a burst gate 45 that receives gating signals from the delay circuit 41. The output of the burst gate 45, in turn, is connected to a detector 46, and this detector feeds its output signals to a flip-flop circuit 47 and specifically to the base of a transistor 48*a* which, together with another transistor 48*b*, makes up the active elements of the flip-flop.

A NAND gate 49 receives signals from the delay circuit 41 and from the flip-flop 47. The output of the NAND gate 49 is connected to a burst gate 50 which receives converted chrominance signals from the band pass filter 44. The output of the burst gate 50 is connected to an automatic gain control circuit 51 which is connected back to the variable gain circuit 37. The output of the burst gate 50 is also connected to a phase control circuit 52, and the output of the latter is connected to an oscillator 53 having a frequency of 4.14MHz. Signals from the oscillator 53 are fed back to the phase control circuit to produce the necessary control effect and are also fed to a gate circuit 54 that receives gating signals from the flip-flop circuit 47. The output of the gate circuit 54 is connected to a second frequency-converter 55 which also receives signals from the low pass filter 38. This circuit converts the frequency of the chrominance signals from a carrier frequency of 0.56MHz to a carrier frequency of 3.58MHz and supplies an output signal to a band pass filter 56. The output of this circuit is connected to the input of a delay circuit 57 and to a mixing circuit 58. The output of the delay circuit 57 is also connected to the same mixing circuit 58 and the output of the mixing circuit is derived at a terminal 59.

Figures 14A, 14B, 14C, 14D, 14E, 14F, 14G, 14H, 14I, 14J, 14K:
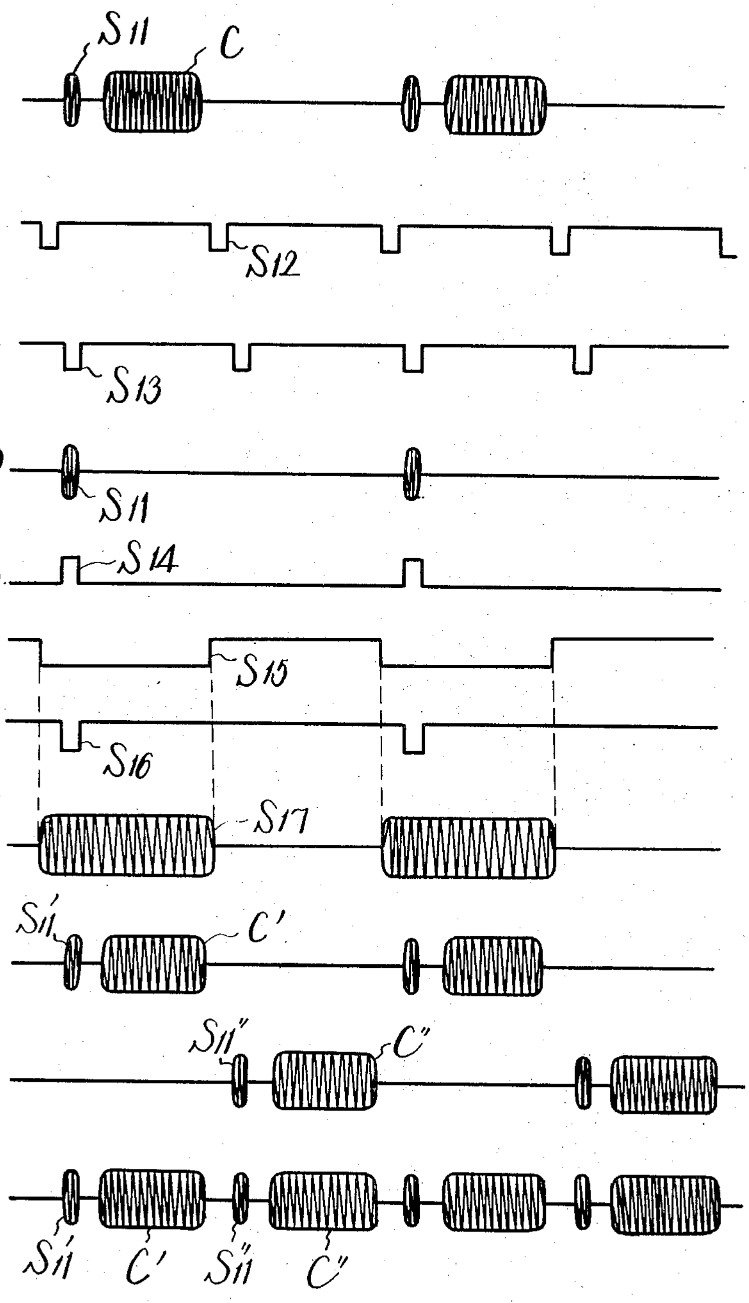
FIGS. 14A–14K illustrate signal wave forms typical of operation of the circuit in FIG. 13.

The operation of the circuit in FIG. 13 will be described with reference to the wave forms in FIGS. 14A–14K. The transducers 35*a* and 35*b* pick up from the magnetic tape a signal that includes both the frequency-modulated luminance components and the gated chrominance components. The latter also include the burst signals and are indicated in FIG. 14A as occurring in alternate line intervals of time. After the luminance signal has been amplified by the preamplifier 36 and demodulated in the demodulator 39, the sync separator 40 separates the horizontal synchronizing signals indicated by the wave $S_{12}$ in FIG. 14B. These signals are delayed in the circuit 41 sufficiently to act as burst gate signals $S_{13}$ shown in FIG. 14C. The chrominance signals and burst signals are passed through the variable gain circuit 37 and the low pass filter 38 to the frequency-converter 42. This circuit shifts the carrier-frequency of the chrominance signals and burst signals to a frequency of 4.14MHz and this converted frequency band passes through the band pass filter 44 to the burst gate 45. The gating signals from the delay circuit 41 allow only the burst signals $S_{11}$ shown in FIG. 14D to pass through the gate 45 and be applied to the detector 46. The detected burst signals are indicated by the wave form $S_{14}$ in FIG. 14E and this pulse signal is applied to the base of the transistor 48*a* in the flip-flop circuit 47 as an identification signal.

The flip-flop circuit 47 has its condition of conductivity reversed at the occurrence of each of the horizontal synchronizing signals $S_{12}$ transmitted from the horizontal sync separator circuit 40 to both of the transistors 48*a* and 48*b*. As a result, the flip-flop 47 generates an output signal $S_{15}$ as shown in FIG. 14F. The purpose of the detected burst signal $S_{14}$ is to reverse the conductivity of the flip-flop 47 if the conductivity is not correct. The detected burst signal $S_{14}$ is a positive pulse and if the base of the transistor 48a is already positive, the positive pulse $S_{14}$ will have no further effect. However, if the base of the transistor 14*a* is at its low level, the burst signal $S_{14}$ will cause a reversal of conductivity of the flip-flop circuit to bring it into the correct time relationship. Thereafter, further burst signals will have no effect.

When the delayed horizontal synchronizing pulses from the circuit 41 and the correct output signal from the flip-flop circuit 47 are applied to the NAND gate 49, the output signal $S_{16}$ shown in FIG. 14G will be produced to be applied as a gating signal to the burst gate 50. This circuit receives the same chrominance and burst signals as the burst gate 45 and produces a gated output signal that controls the AGC circuit 51 to apply a controlling signal to the variable gain circuit 37, to adjust its gain as necessary to provide the correct amplitude of chrominance signals.

The output signal of the burst gate 50 is also applied to the phase control circuit 52 and from there to the oscillator 53 to produce a phase controlled oscillation having a frequency of 4.14MHz. This signal is gated in a gate circuit 54 by the output signal of the flip-flop 47 so that it is applied during alternate line intervals to the second frequency-converter 55.

This frequency-converter 55 receives the chrominance signals from the low pass filter 38 and converts them to a band around the correct carrier-frequency of 3.58MHz. These signals are applied to the frequency-converter 55 only during the same alternate line intervals that the gated oscillations from the oscillator 53 are supplied. The latter are indicated by the signal $S_{17}$ in FIG. 14H. The band pass filter 56 allows only the properly converted chrominance signals $C'$ and $S_{11}'$ shown in FIG. 14I to pass through to the delay circuit 57. These signals are delayed 1H in the circuit 57 and appear as an output comprising the chrominance signals $C''$ and $S_{11}''$ shown in FIG. 14J. Both the non-delayed and delayed signals are mixed in the mixing circuit to produce, at the output terminals 59, a complete signal of the type shown in FIG. 14K and comprising the chrominance signals $C'$ and the burst signals $S_{11}'$ as well as the chrominance signals $C''$ and the burst signals $S_{11}''$. The mixing circuit 58 also mixes these signals with the demodulated luminance signal from the demodulator 39 to form a reconstituted video signal. As is well known, there is relatively little change in the chrominance signal from line to line and thus the use of the delayed chrominance signals $C''$ in place of the non-recorded chrominance signals has no adverse effect on the quality of the picture.

When the apparatus shown in FIG. 13 is used to reproduce signals as recorded in the examples illustrated in FIGS. 5B, 6B and 7B, it is necessary to change the state of conductivity of the flip-flop 47 at the beginning of each new field. This is accomplished by the identification furnished by the detected burst signal $S_{14}$ in FIG. 14E and since this occurs during the vertical blanking interval there is no visible effect on the screen of the image reproducing device fed by signals from the output terminal 59. After the state of conductivity of the flip-flop circuit 47 has been reversed at the beginning of each new field, it will remain correct for the rest of that field.

One further advantage of the circuit shown in FIG. 13 is that it contains no switching circuits in the signal path of the chrominance signals and therefore there are no switching transients to have an adverse effect on these signals.

Figure 15:
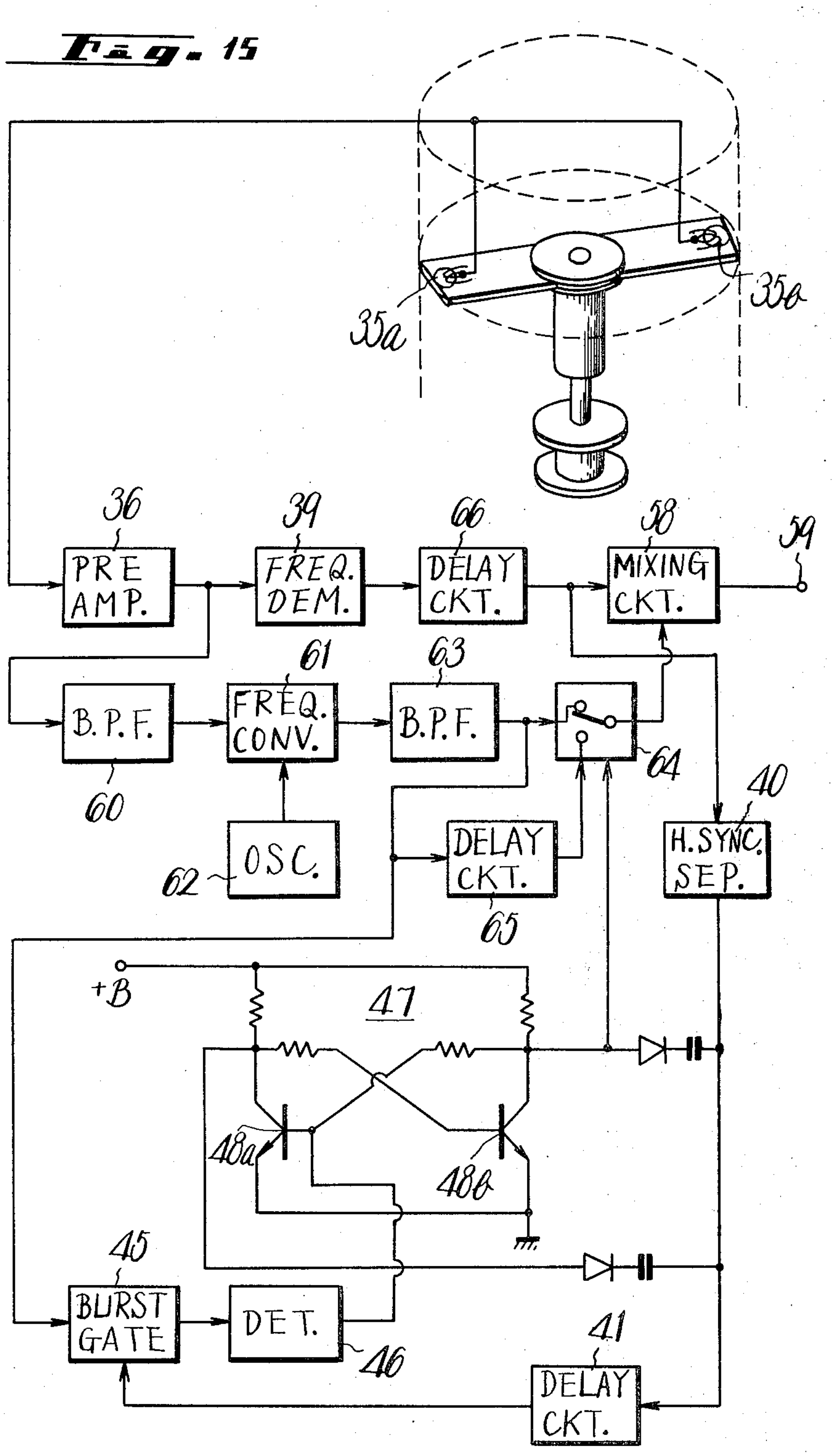
FIG. 15 is another embodiment of reproducing apparatus in accordance with this invention.

FIG. 15 shows a simplified circuit for reproducing recorded signals in accordance with this invention. In this simplified arrangement the playback transducers 35a and 35b are connected to the preamplifier 36, the output of which is connected to the frequency-modulation detector 39 as before. However, the output of the demodulator 39 is passed through a delay circuit 66 before being applied to the sync separator 40 and the mixing circuit 58. The output of the sync circuit 40 is connected to the delay circuit 41 and to both sides of the flip-flop circuit 47 as in the embodiment shown in FIG. 13.

The output of the preamplifier 36 is also connected to a band pass filter 60 and the output of this filter is connected to a frequency-converter 61 which is supplied with oscillations from an oscillator 62. The output of the frequency-converter 61 is applied to a band pass filter 63 and from there to a delay circuit 65 and to one of the stationary terminals of a switching circuit 64. The output of the delay circuit 65 is connected to the other stationary terminal of the switching circuit 64 and the arm of the switching circuit is connected to the mixing circuit 58.

The operation of the apparatus in FIG. 15 is basically similar to that in FIG. 13. However, the signal from the transducers 35*a* and 35*b* is always passed through the frequency-converter 61 and converted therein by the continuously supplied oscillations from the oscillator 62 regardless of whether or not the transducers 35*a* and 35*b* are picking up chrominance signals. Thus when the transducers are covering sections of the tracks on which no chrominance signals have been recorded, they pick up some noise which is not filtered out by the filters 60 and 63. In order to minimize this noise before the signals are applied both directly and through the delay circuit 65 to the mixing circuit 58, the delayed and non-delayed signals are passed through the switching circuit 64 so that only the signal that is active, i.e., that includes a chrominance signal, will be passed along to the mixing circuit 58. Thus the switching circuit 64 must be operated so that, when a line interval is being picked up that has a chrominance signal recorded in it, the arm of the switching circuit will be connected directly to the output of the band pass filter 63. However, during the next interval of time when no chrominance signal is being picked up by the transducers, the arm of the switching circuit 64 must be connected to the output of the delay circuit 65. Switching back and forth at the proper intervals is not only necessary to allow the chrominance signal and the delayed replica thereof to reach the mixing circuit 58 but has the added advantage of not transmitting to the mixing circuit 58 those intervals when no chrominance signal is present but only noise would be added to the input of the mixing circuit. However, this advantage is achieved at the expense of incurring some switching transients.

In the embodiment described hereinabove, only a selected portion, the chrominance signal portion, of the complete video signal is gated. However, it may be desirable under certain circumstances to gate the entire video signal.

Figure 16:
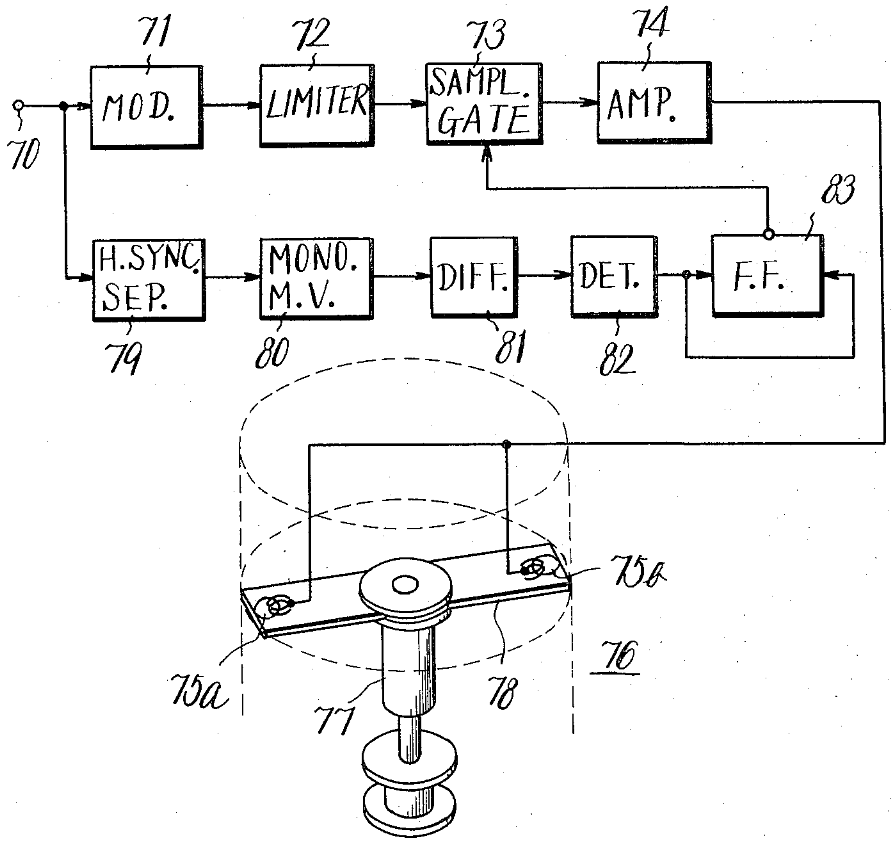
FIG. 16 is a simplified form of reproducing apparatus in accordance with this invention, for reproducing monochrome video signals.

FIG. 16 shows a recording arrangement for doing so. In FIG. 16 the input terminal 70 is connected to a frequency-modulator 71 so that the entire video signal is used to modulate a carrier. The frequency-modulated carrier is connected to a limiter 72 and from there to a sampling gate 73. The sampled signal from the gate 73 is amplified by an amplifier 74 and applied to a pair of tranducers 75a and 75b in a rotary magnetic head assembly 76. A rotating shaft 77 driven by a motor (not shown) rotates a support 78, and the transducers are attached to opposite ends of this support so that they are diametrically opposite each other with respect to the axis of the shaft 77.

The input terminal 70 is also connected to a horizontal synchronizing signal separator 79, the output of which is connected to a monostable multivibrator 80. The output of the monostable multivibrator is connected to a differentiating circuit 81 and this, in turn, is connected to a detector 82. The output of the detector is applied to a flip-flop circuit 83 that controls the sampling in the gate 73.

It is desirable, as before, that the signal be passed through the sampling gate 73 during alternate line intervals. Therefore the flip-flop 83 must produce an output signal which opens the gate 73 for one line interval and closes it for the next line interval. In order to keep switching transients out of the visible image at the time of reproduction, this switching should take place just before the horizontal synchronizing pulse that starts each line. This means that the leading edge of the horizontal pulse of the preceding line must be used to actuate the flip-flop 83 but must be delayed almost one line period. This delay is accomplished by using each horizontal synchronizing pulse to actuate the monostable multivibrator to produce a pulse having a duration only slightly less than 1H. Then, when this pulse is differentiated, the trailing edge may be selected by the detector 82 and used to control the operation of the flip-flop circuit 83.

As in previous circuits it may be difficult to cause a single monostable multivibrator to produce the necessary output pulse that has one value for greater than 0.9H and the other value for less than 0.1H. The necessity may be avoided by utilizing two monostable multivibrators in cascade. The first should have a time constant that causes it to produce, in response to actuation by a horizontal synchronizing signal, a pulse having a duration greater than 0.5H. Then equalizing pulses that occur at 0.5H will not have any effect on the first monostable multivibrator. For example, the first monostable multivibrator may have an output pulse which has a duration of 0.7H. This pulse is used to actuate a second monostable multi-vibrator which produces an actuated pulse having a duration of somewhat less than 0.3H so that the total of the 0.7H and the less than 0.3H will result in the necessary time delay when the output of the second monostable multivibrator is differntiated by the differentiating circuit 81.

Figure 17A:
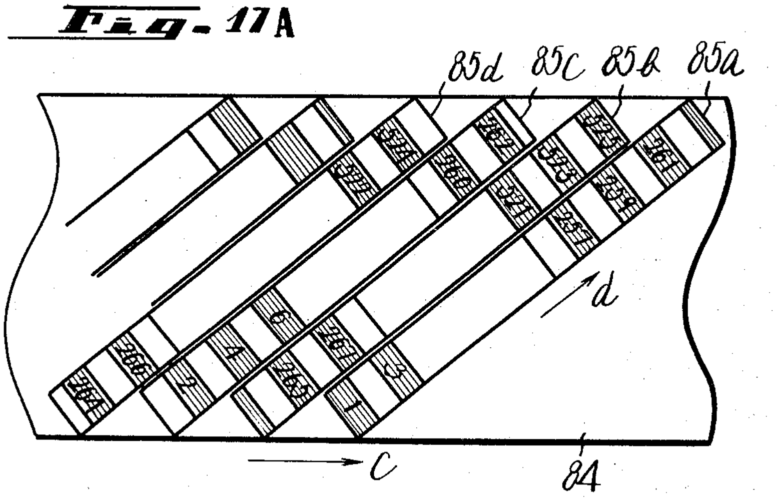
FIGS. 17A and 17B correspond to the recording relationships illustrated in FIGS. 5A and 5B, respectively, but illustrate intermittent recording of the entire video signal instead of only the chrominance components thereof.
Figure 17B:
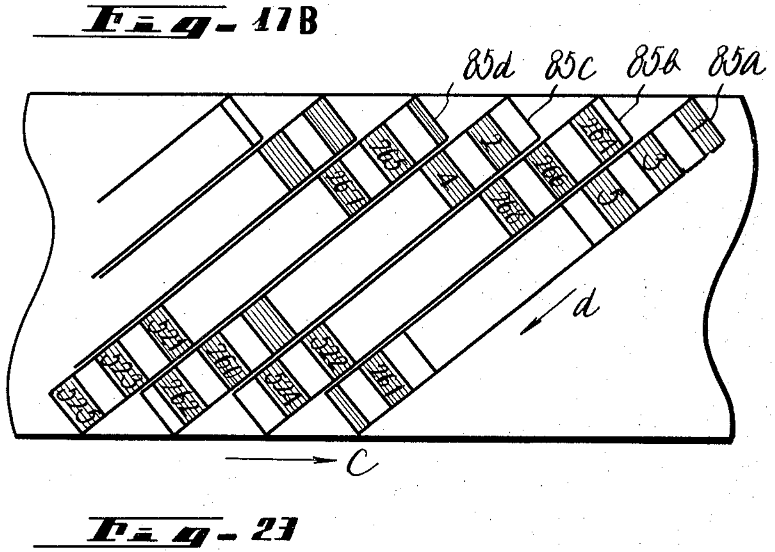

When the signals at the transducers *75a* and *75b* are recorded on a tape, they produce the patterns shown in FIGS. 17A or 17B. The difference between these patterns is that in FIG. 17A the tape 84 is moving in the direction indicated by the arrow C and the transducers *75a* and *75b* are moving in the direction indicated by the arrow *d* and having a component in the same direction as the arrow C. In FIG. 17B the tape is moving in the same direction but the transducers *75a* and *75b* are moving in opposite direction, as indicated by the arrow *d*, which has a component opposite the direction of the arrow C.

Figure 18:
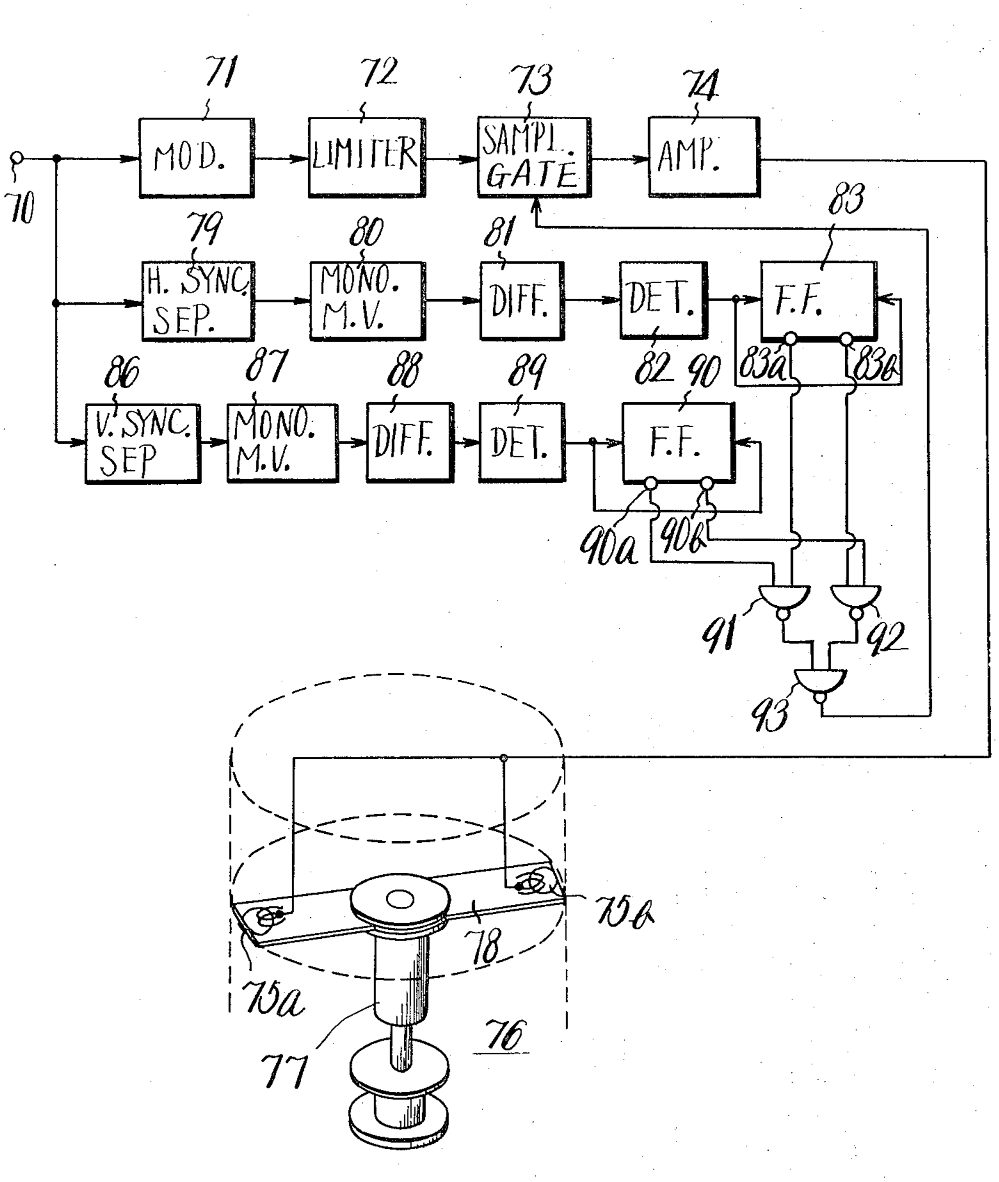
FIG. 18 is still another embodiment of recording apparatus in accordance with this invention.
Figure 21:
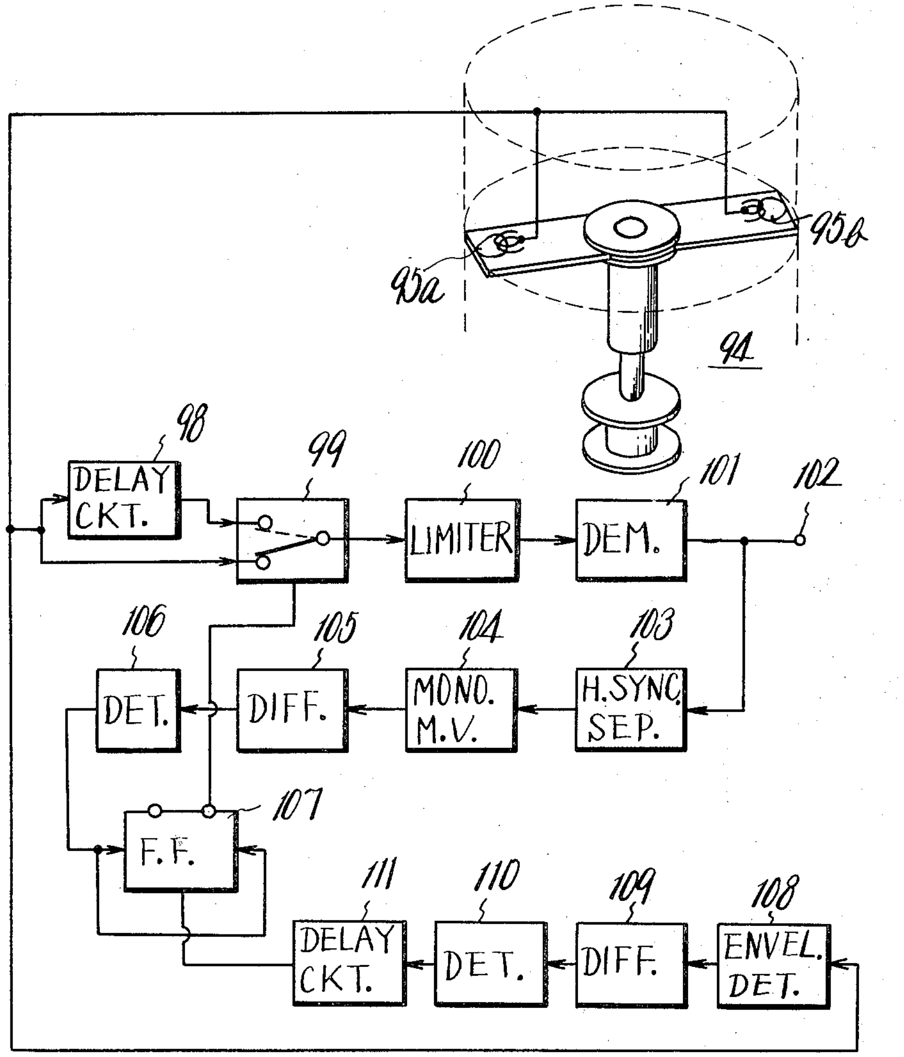

Although the signals are recorded along linear tracks *85a–85d* in FIGS. 17A and 17B, no signals at all are recorded in half of the line intervals and therefore the recordings are indicated as separate shaded blocks. As may be seen, the blocks are aligned with respect to each other in the required checkerboard fashion in accordance with this invention. The alignment relationship is such that $X = 3$ in the firsjt equation for both FIGS. 17A and 17B. The pattern of FIG. 17A can be recorded by simply switching the sampling gate 73 on and off for alternate line intervals. This will produce not only the correct sampling for the first track *85a* but for each subsequent track *85b–85d*. However, the pattern in FIG. 17B requires a more complex switching arrangement of the type set forth in FIG. 8. A simplified version of this circuit arrangement is shown in FIG. 18. This simplification is possible because the entire signal is switched and not just the chrominance components thereof.

Those elements of FIG. 18 that are the same as in FIG. 16 are indicated by similar reference numerals and need not be described again. The additional elements include a vertical synchronizing signal separator 86 which is connected to the input terminal 70 and supplies a signal to a monostable multivibrator 87. The output of the monostable multivibrator 87 is applied to a differentiating circuit 88, and the output of this circuit, in turn, is connected to a detector 89. The output of the detector 89 is applied to control a second flip-flop circuit 90.

The logical combination of the output signals from the flip-flops 83 and 90 is obtained by signals from the terminals 83a of the flip-flop 83 and 90a of the flip-flop 90 to a first NAND gate 91. Output terminals 83b and 90b of the flip-flops 83 and 90, respectively, are connected to a second NAND gate 92 and the outputs of the two NAND gates 91 and 92 are connected to a third NAND gate 93, which generates the necessary sampling signal to be applied to the sampling gate 73. The operation of the NAND gates 91, 92 and 93 is exactly the same as the NAND gates 31, 32 and 33 in FIG. 8. Reference may be made to FIG. 9 for the switching wave forms.

Figure 19:
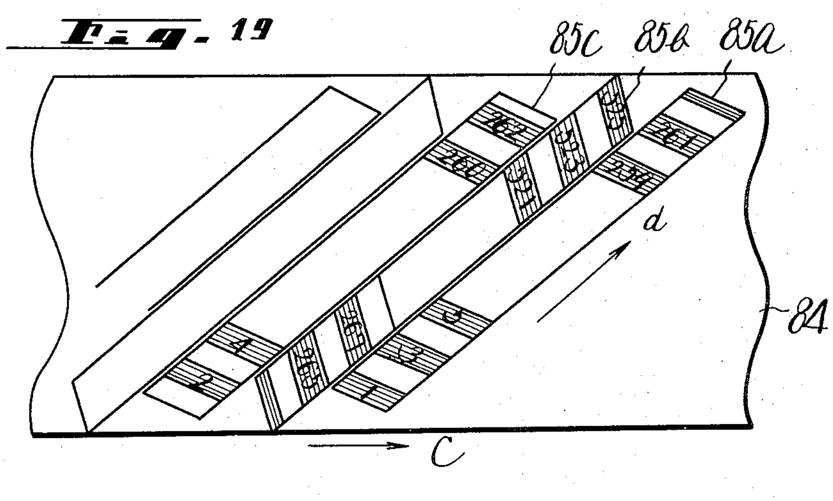
FIG. 19 illustrates a recording relationship similar to that in FIG. 11 but with the entire signal being sampled instead of just the chrominance components.

The recordings indicated in FIGS. 17A and 17B are made with the azimuth angle of the transducers 75a and 75b at 90°, i.e., perpendicular to the direction of the tracks *85a–85d*. Since there are no signals adjacent each other on these tracks, the guard band space between adjacent tracks may be reduced to zero or the tracks may even be overlapped. The same recordings may be made with transducers *75a* and *75b* having different azimuth angles. The resultant recordings would be as shown in FIGS. 19 and 20. FIG. 19 shows the tracks *85a–85c* spaced slightly apart so that there is still some guard band distance between adjacent tracks but FIG. 20 shows the tracks 85a–85d actually overlapping. The difference in the azimuth angles of the two transducers used to record the tracks must of course be matched by the azimuth angles of the transducers used in reproducing the tracks, and these different azimuth angles help in avoiding picking up signals from the wrong tracks.

Figure 21:
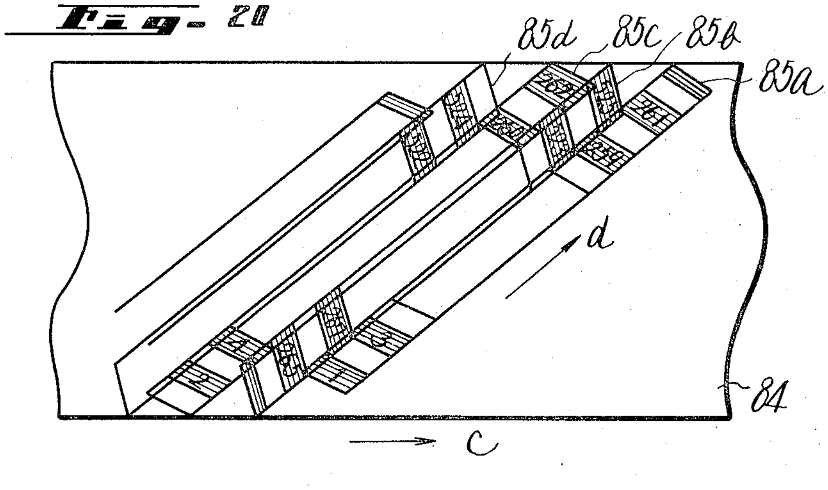
FIG. 21 is a block diagram of another embodiment of a reproducing apparatus in accordance with the present invention.

FIG. 21 shows apparatus suitable for reproducing signals recorded either by the apparatus of FIG. 16 or that of FIG. 18. The reproducing apparatus in FIG. 21 includes a rotary magnetic head assembly 94 comprising two transducers 95a and 95b that may be the same as the transducers 75a and 75b in FIGS. 16 and 18. In any case, the transducers 95a and 95b must have the same azimuth angles as the transducers used to record the tape that is to be played back by the reproducing apparatus in FIG. 21. The output of the transducers 95a and 95b is connected to the input of a delay circuit 98 and to one of the fixed terminals of a switching circuit 99. The output of the delay circuit 98 is connected to the other fixed terminal of the switching circuit 99 and the movable arm of the switching circuit is connected to a limiter 100. The output of the limiter is connected to a frequency-demodulator 101 and from there the signal is applied to an output terminal 102 and to a horizontal synchronizing signal separator circuit 103. The output of the sync separator 103 is connected to a monostable multivibrator 104 and the output of this circuit, in turn, is connected to a differentiating circuit 105. The output of the differentiating circuit 105 is applied to a detector 106 and the output of the detector is connected to control a flip-flop circuit 107.

The signal from the transducers 95a and 95b is also connected to an envelope detector 108. The output of the envelope detector 108 is connected to a differentiating circuit 109, and the output of this differentiating circuit is applied to a detector 110. The detector, in turn, is connected to a delay circuit 111 and the delayed signal from this circuit is applied to the flip-flop 107 as an identification signal.

Figures 22A, 22B, 22C, 22D, 22E, 22F, 22G, 22H, 22I, 22J, 22K:
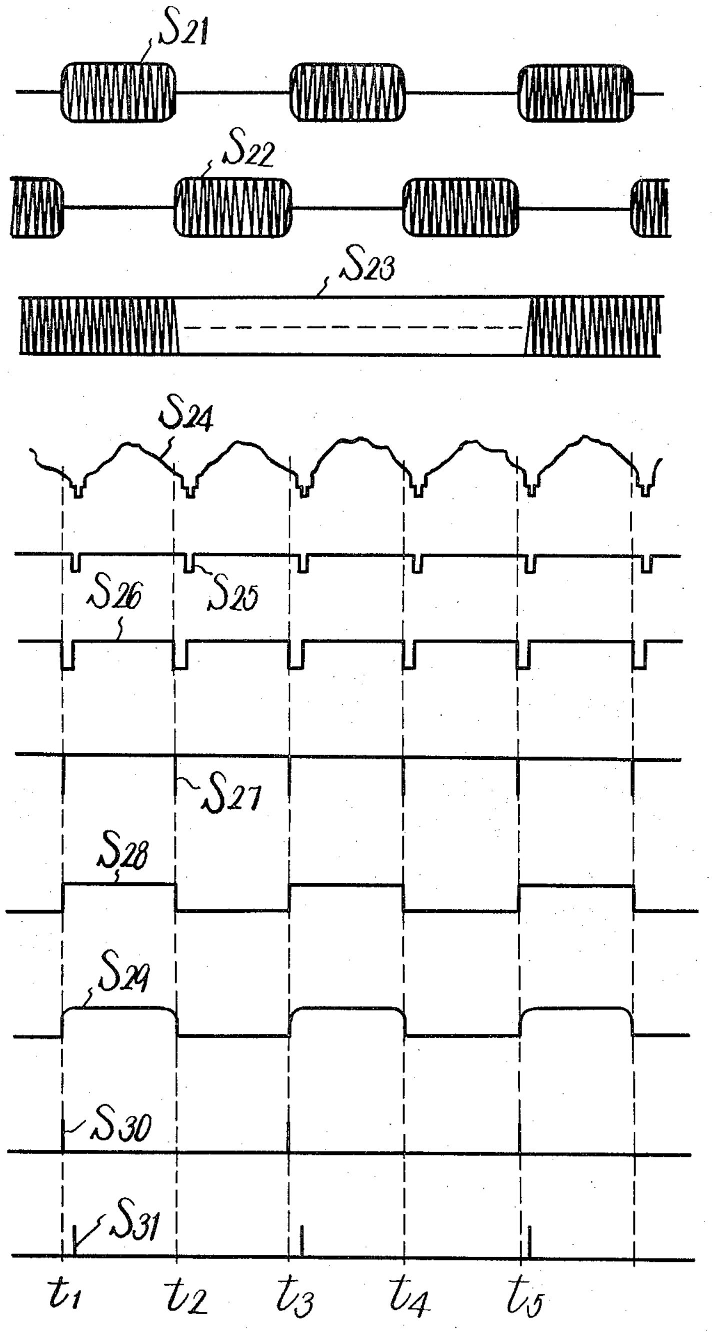
FIGS. 22A–22K illustrate typical signals obtained in the operation of the circuit in FIG. 21.

The operation of the apparatus in FIG. 21 will be described in connection with the wave form diagrams shown in FIGS. 22A–22K. The signal $S_{21}$ shown in FIG. 22A is the entire signal picked up by the transducers 95a and 95b and not just the chrominance components thereof. As may be seen this signal is present only during alternate line intervals. This signal is applied both to the delay circuit 98 and directly to the switching circuit 99. During those line intervals that the signal $S_{21}$ is present, the arm of the switching circuit 99 must be connected to the terminal that is directly joined to the transducers 95a and 95b. During alternate intervals of time, when there is no signal being picked up by the transducers 95a and 95b, the arm of the switching circuit 99 must be connected to the output of the delay circuit 98 to receive the delayed replica of the preceding line interval. This signal is indicated as $S_{22}$ in FIG. 22B. The combination of these two signals at the arm of the switching circuit 99 is a continuous signal $S_{23}$ shown in FIG. 22C. This signal is limited in the limiter 100 and demodulated in the demodulator 101 and made available at the output terminal 102 for connection to any suitable video reproduction device to produce a television image.

The wave form of the signal at the output terminal 102 is indicated in FIG. 22D as the signal $S_{24}$. This signal is applied to the horizontal sync separator 103 which extracts the horizontal synchronizing signals to produce a wave form $S_{25}$ shown in FIG. 22E. This signal is then applied to the monostable multivibrator 104 to produce a relatively long pulse at the occurrence of each of the horizontal synchronizing pulses to form the wave form $S_{26}$ shown in FIG. 22F. The limitations on forming such a wave in a sigle step have been set forth hereinabove and it will be obvious that the monostable multivibrator 104 may be divided into two such multivibrators connected in cascade.

The output signal $S_{26}$ of the monostable multivibrator 104 is differentiated by the differentiating circuit 105 and detected, or clipped, by the detector 106 to produce a wave form $S_{27}$ shown in FIG. 22G which comprises a series of impulses timed to correspond to the trailing edge of each of the long pulses generated by the monostable multivibrator 104. These pulses are then applied to the flip-flop circuit 107 to cause it to reverse its state of conductivity at the occurrence of each of the pulses $S_{27}$, thereby producing a square wave $S_{28}$ shown in FIG. 22H. This wave changes its state of conductivity in synchronism with the horizontal synchronizing interval but not exactly at the occurrence of each of the horizontal synchronizing pulses. The square wave $S_{28}$ is used to control the switching circuit 99 to cause it to be conductive in the proper way to generate the continuous signal $S_{23}$ shown in FIG. 22C.

In order to assure that the flip-flop circuit 107 produces an output signal $S_{28}$ having the proper polarity and not the reverse polarity, an identification circuit is used. This identification circuit includes the envelope detector which detects the presence of signals from the transducers 95a and 95b during those line intervals when there are signals to be derived from the magnetic tape. The output of the envelope detector is indicated by the signal wave form $S_{29}$ in FIG. 22I and this wave form is differentiated by the differentiating circuit 109 and detected by the detector 110 to produce a series of pulses $S_{30}$ shown in FIG. 22J that correspond to the leading edges of the intervals when there are signals being picked up by the transducers 95a and 95b. The impulse signals indicated by the wave form $S_{30}$ are delayed slightly to form the signal $S_{31}$ shown in FIG. 22K and this signal is then applied to the flip-flop circuit 107 as an identification signal. If the flip-flop circuit is operating in the proper time relationship, the arrival of the pulses $S_{31}$ will not reverse the state of conductivity of the flip-flop circuit. On the other hand, if the flip-flop circuit is producing the wrong polarity of signals to control the switching circuit 99, the arrival of the next one of the pulses $S_{31}$ will reverse the state of conductivity of the flip-flop circuit. As indicated previously in connection with FIG. 13, if the signals have been recorded on the tape in such a way that reversal of the state of conductivity of the flip-flop circuit 107 is required at the beginning of each new field, this will automatically be accomplished by the first one of the pulses $S_{31}$ that occurs in the new field.

Figure 23:
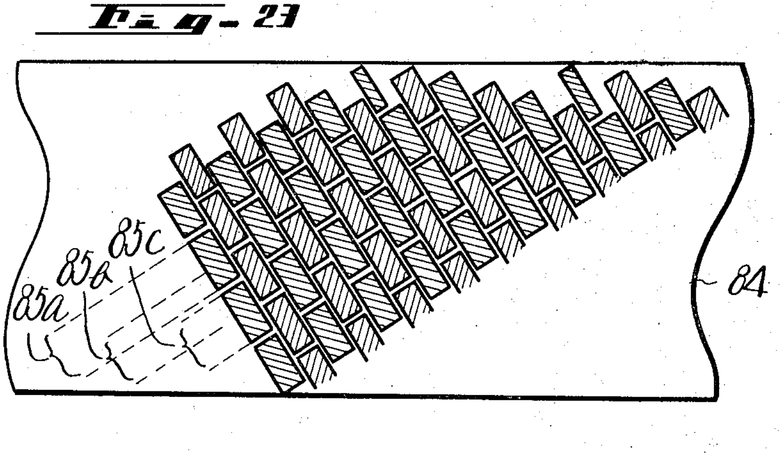
FIG. 23 illustrates a recording relationship using a 90° azimuth angle and intermittent gating of the whole video signal to allow maximum overlapping of adjacent recording tracks.

One of the advantages of completely interrupting the video signal during alternate line intervals is that the center-to-center distance between adjacent slant tracks may be reduced to an absolute minimum. This is indicated in FIG. 23 where the adjacent tracks 85a–85c are completely interleaved with each other so that the center-to-center distance between adjacent tracks 85a and 85b, for example, is only slightly greater than one-half the width of each of the tracks.

In the foregoing examples the signal is sampled at every other line interval and is then recorded. However, it is to be understood that the signal may be sampled, for example, at every third line interval or every fourth line interval, or the like and then recorded.

What is claimed is:

1. A system for improved utilization of magnetic tape for recording a video signal having line and field intervals, said system comprising:

A. gating means to gate alternating, sub-stantially equal intervals of at least selected portions of said signals; and B. recording means connected to receive the resultant gated signal to record said gated signal in parallel tracks on said tape such that the areas in which said selected gated portions are recorded in each track have their edges substantially aligned with proximal edges of areas in which said selected gated portions are not recorded in the next adjacent track.

2. The system of claim 1, in which said video signal is a color video signal and said system comprises, in addition, selection means for selecting chrominance components of said video siganl as said selected portions, said selection means being connected to said gating means to supply said selected portions thereto.

3. The system of claim 2 comprising, in addition:

A. luminance signal selection means; and

B. means for connecting said luminance signal to said recording means to record said luminance signal and said certain components of said chrominance signal on said tape.

4. The system of claim 3, in which said means for connecting said luminance signal to said recording means comprises a frequency modulator to modulate an oscillator having a higher frequency than said luminance signal.

5. The system of claim 4 comprising, in addition, a frequency converter connected to said selection means to convert said chrominance components to a frequency band below the frequency band of said frequency-modulated oscillator.

6. The system of claim 5 in which said frequency modulator is connected to said gating means so that said gating means gates the frequency-converted chrominance signal.

7. The system of claim 1 comprising; in addition, means for connecting the whole video signal to said gating means, whereby said selected portions comprise said whole video signal.

8. The system of claim 1 in which said gating means gates alternate line intervals of said video signal.

9. The system of claim 8 in which said video signal has frame intervals, each composed of two interlaced fields, and said gating means gates alternate line intervals in the same order for first and second field intervals and gates alternate line intervals in the reverse order for third and fourth field intervals.

10. The system of claim 9 in which said first and second fields comprise a first frame, and said third and fourth fields comprise a second frame, and said gating means supplies gating signals without reversal throughout the image portion of said first and second frames.

11. The system of claim 10 in which said first field is the last field of a first frame, and said second and third fields are the two fields of a second frame, and said fourth field is the initial field of a third frame, and said gating means reverses the order of said gating signals at the beginning of each of said frames.

12. The system of claim 11 in which said gating means comprises:

A. means to generate a first square wave gating signal having on and off intervals each equal to one of said line intervals;

B. means to generate a second square wave gating signal having on and off intervals each equal to one of said field intervals;

C. a first NAND gate to combine both said first and second gating signals in one polarity;

D. a second NAND gate to combine both said first and second gating signals in the opposite polarity; and E. a third NAND gate connected to said first and second NAND gates to combine both of their output signals to form a final gating signal to gate said selected portions.

13. The system of claim 8 in which said gating means comprises:

A. means to generate a continuous square wave signal having a period equal to two of said horizontal line intervals; and B. Delay means to delay the leading and lagging edges of each wave of said signal a predetermined time with respect to the beginning of each horizontal line interval.

14. The system of claim 13 in which said delay means comprises monostable multivibrator means.

15. The system of claim 14, in which said monostable multi-vibrator means is timed to generate pulses having a length greater than one-half of a horizontal line interval and a leading edge substantially coinciding with the beginning of each horizontal line interval.

16. The system of claim 1 in which said recording means comprises:

A. tape drive means to drive said tape in a first direction during recording;

B. transducer means; and

C. head drive means to move said recording head means along said parallel tracks, said transducer means determining the width of each of said tracks, and said tape drive means moving said tape relative to said transducer means a distance such that the center-to-center distance between adjacent ones of said tracks is not substantially greater than the width of one of said tracks.

17. The system of claim 16 in which the center-to-center distance between said adjacent tracks is substantially equal to the width of one of said tracks.

18. The system of claim 16 in which said center-to-center distance is less than the width of one of said tracks.

19. The system of claim 16 in which said transducer means defines an air gap substantially perpendicular to each of said tracks.

20. The system of claim 16 in which said transducer means comprises a first transducer having an air gap at a first azimuth angle and a second transducer having an air gap at a second azimuth angle.

21. The system of claim 16 in which said selected portions are gated for alternate line intervals and said areas of adjacent tracks are offset according to the equation:

$$P \cos \theta = (x - 1/2)\, h$$

where: $P$ is the spacing of like points of adjacent tracks as measured in the direction of movement of said tape, $\theta$ is the angle between said direction of movement and the direction of said tracks, $h$ is the distance along said tracks to record one line interval, and $x$ is an integer.

22. The system of claim 21 in which said recording means comprises means to record said tracks in a direction having a component in the direction of movement of said tape, and $x$ is an odd integer.

23. The system of claim 21 in which said recording means comprises means to record said tracks in a direction having a component in the direction of movement of said tape, and $x$ is an even integer.

24. The system of claim 21 in which said recording means comprises means to record said tracks in a direction having a component opposite the direction of movement of said tape, and $x$ is an even integer.

25. The system of claim 21 in which said recording means comprises means to record said tracks in a direction having a component opposite the direction of movement of said tape, and $x$ is an odd integer.

26. The system of claim 1 comprising, in addition, reproducing means to scan said tracks and reproduce, in order, the signals recorded thereon.

27. The system of claim 26 in which said playback means comprises frequency-demodulator means.

28. The system of claim 27 comprising, in addition, means to convert the frequency of the reproduced selected portions.

29. The system of claim 26 in which said playback means comprises:

A. means to delay intervals of the reproduced signals in which said selected portions occur to form delayed replicas of said reproduced intervals, the duration of said delay being an odd multiple of one of said intervals; and B. means to combine said reproduced signals and said delayed replicas to form a continuous signal.

30. The system of claim 29 comprising, in addition, means to supply said selected portions of said reproduced signals to said delay means only during intervals in which said reproduced signals occur.

31. The system of claim 30 in which said means to supply comprises:

A. a frequency converter;

B. a source of oscillations of a frequency to convert said reproduced signals to a predetermined frequency band; and C. switching means to connect said oscillator to said frequency converter only during the occurrence of said selected portions.

32. The system of claim 31 comprising, in addition, an identification circuit connected to receive signals during the occurrence of said selected portions and to said switching means to derive a control signal from said selected portions to control the order of timing of said switching means.

33. A system to reproduce a video signal recorded on magnetic tape in a series of parallel tracks, at least selected portions of said signals being recorded in intermittent intervals spaced by intervals of equal length, the recorded intervals in each track being aligned side by side with the spacing intervals in the adjacent tracks, said system comprising:

A. transducer means to produce electrical reproductions of signals recorded on said tracks;

B. means to delay the reproduced intermittent signals for a length of time equal to an odd multiple of one of said intermittent intervals to produce delayed replicas of said reproduced intermittent signals; and C. means to combine said reproduced intermittent signals and said delayed replicas to form a continuous signal.

34. The system of claim 33 comprising, in addition:

A. switching means actuated in synchronism with horizontal synchronizing signal components of said reproduced signals; and B. identification means separately controlled by said reproduced intermittent signals to control the order of operation of said switching means.

35. The system of claim 34, in which said switching means comprises: a first input terminal connected to said transducer means to receive said intermittent signal therefrom, a second input terminal connected to said delay means to receive said delayed replicas therefrom, and an output terminal connected alternately to said first and second input terminals to form said continuous signal from said intermittent signal and said delayed replicas, and said system comprises, in addition:

A. a synchronizing circuit connected to said output terminal of said switching means to derive a synchronizing pulse signal from said continuous signal; and, B. actuating means connected to said switching means to control the operation thereof and connected to said synchronizing circuit to be controlled thereby, said identification means being connected to said transducer means to receive said intermittent signals therefrom and being connected to said actuating means to control the time relationship of operation of said switching means whereby said output terminal will be connected to said first input terminals to receive each intermittent signal and will be connected to said second input terminal to receive each delayed replica thereof.

36. The system of claim 34 in which said recorded video signal comprises a luminance component and horizontal synchronizing signals recorded in each of said intermittent intervals and each of said spacing intervals, and said selected portions comprise chrominance and burst signals during alternate line intervals, said system comprising, in addition:

A. a luminance circuit connected to said transducer means to reproduce said luminance component and horizontal synchronizing signals;

B. a synchronizing circuit connected to said luminance circuit to derive said synchronizing signals therefrom and connected to said switching means to control the switching rate thereof; and C. a chrominance and burst signal circuit connected to said transducer means to reproduce said chrominance and burst signals during alternate line intervals, said identification means being connected to said chrominance and burst signal circuit to derive burst signals therefrom during said alternate line intervals to control the order of operation of said switching means.

37. The system of claim 33 in which said recorded video signal comprises a luminance component and horizontal synchronizing signals recorded in each of said intermittent intervals and each of said spacing intervals, and said selected portions comprise chrominance and burst signals converted to a predetermined frequency band and recorded during alternate line intervals, said system comprising, in addition:

A. a luminance circuit connected to said transducer means to reproduce said luminance component and horizontal synchronizing signals;

B. a synchronizing circuit connected to said luminance circuit to derive said synchronizing signals therefrom;

C. a chrominance and burst signal circuit connected to said transducer means to reproduce said chrominance and burst signals during alternate line intervals and comprising:

1. a frequency converter, 2. means to supply a carrier signal to said converter to reconvert the frequency of said chrominance and burst signals to an original frequency band, and 3. switching means to supply said carrier signal to said converter only during said alternate line intervals.

38. The method of obtaining improved use of the area of magnetic tape for recording a video signal having line and field intervals, said method comprising the steps of:

A. gating at least selected portions of said signal; and

B. recording the gated signal in parallel tracks on said tape, the location of areas in which said selected gated portions are recorded in each track having their edges substantially aligned with proximal edges of areas in which said selected gated portions are not recorded in the next adjacent track.

* * * * *